US012767559B2

(12) United States Patent
Guo et al.

(10) Patent No.: US 12,767,559 B2
(45) Date of Patent: Oct. 20, 2026

(54) SHOWER WATER FILTRATION ASSEMBLIES

(71) Applicant: Xiamen Prime Shower Co., Ltd., Xiamen (CN)

(72) Inventors: Jing Guo, Xiamen (CN); Haibo Hong, Xiamen (CN); Qin Yu, Xiamen (CN)

(73) Assignee: Xiamen Prime Shower Co., Ltd., Xiamen (CN)

( * ) Notice: Subject to any disclaimer, the term of this patent is extended or adjusted under 35 U.S.C. 154(b) by 602 days.

(21) Appl. No.: 18/447,728

(22) Filed: Aug. 10, 2023

(65) Prior Publication Data

US 2023/0382764 A1 Nov. 30, 2023

(30) Foreign Application Priority Data

Jul. 4, 2023 (CN) ......................... 202310813209.9

(51) Int. Cl.
*C02F 1/00* (2023.01)
*C02F 103/02* (2006.01)

(52) U.S. Cl.
CPC .......... *C02F 1/003* (2013.01); *C02F 2103/02* (2013.01); *C02F 2201/002* (2013.01); *C02F 2307/06* (2013.01)

(58) Field of Classification Search
None
See application file for complete search history.

(56) References Cited

U.S. PATENT DOCUMENTS 13,026 A * 6/1855 Clarke .................... B01D 29/35 137/550
251,335 A * 12/1881 Benson .................. B01D 33/06 210/267
261,014 A * 7/1882 Mclachlan ............. B01D 35/02 210/447
261,119 A * 7/1882 Adams ................... B01D 29/15 210/443
266,693 A * 10/1882 Horsnell .............. B01D 35/043 210/390
268,420 A * 12/1882 Luther ................. B01D 35/043 210/390
270,881 A * 1/1883 Aborn .................. B01D 35/043 285/119

(Continued)

FOREIGN PATENT DOCUMENTS

CN 201899924 U 7/2011
CN 203470230 U 3/2014
CN 210385108 U * 4/2020

*Primary Examiner* — Robert J Popovics

(57) ABSTRACT

Disclosed is a filtering device arranged outside a water outlet piece. A communication seat is provided with a water inlet channel and a water outlet channel, the water inlet channel runs through from a water inlet portion to a water-passing communication portion, and the water outlet channel runs through from the water-passing communication portion to a water outlet portion; a filtering assembly is connected with the water-passing communication portion, and includes a filter element, wherein a water inlet end of the filter element communicates with the water inlet channel, and a water outlet end of the filter element communicates with the water outlet channel, so that the filtering assembly is convenient to replace and low in maintenance cost, the installation is not easy to limit, and the adaptability is high.

5 Claims, 14 Drawing Sheets

(56) References Cited

U.S. PATENT DOCUMENTS

| | | | | | | |
|---|---|---|---|---|---|---|
| 322,722 | A | * | 7/1885 | Howes | B01D 37/025 | 417/442 |
| 379,801 | A | * | 3/1888 | Mcdonald | B01D 35/043 | 210/390 |
| 383,493 | A | * | 5/1888 | Sargent | B01D 35/02 | 210/489 |
| 427,029 | A | * | 4/1890 | Bardez | B01D 35/043 | 210/390 |
| 554,280 | A | * | 2/1896 | Linke | B01D 35/043 | 210/450 |
| 579,232 | A | * | 3/1897 | Harris | B01D 35/043 | 210/427 |
| 598,719 | A | * | 2/1898 | Totham | B01D 35/043 | 210/441 |
| 606,804 | A | * | 7/1898 | Eastman | B01D 35/043 | 210/418 |
| 680,681 | A | * | 8/1901 | Avezard | B01D 35/043 | 210/423 |
| 682,353 | A | * | 9/1901 | Geisler | B01D 35/14 | 210/426 |
| 748,251 | A | * | 12/1903 | Allen | B01D 29/33 | 415/121.2 |
| 773,946 | A | * | 11/1904 | Langill | C02F 1/003 | 210/284 |
| 776,550 | A | * | 12/1904 | Rice | B01D 29/05 | 210/414 |
| 788,145 | A | * | 4/1905 | Pendergast | B01D 35/043 | 210/426 |
| 808,910 | A | * | 1/1906 | Dunham | B01D 35/043 | 137/613 |
| 816,440 | A | * | 3/1906 | Dunham | B01D 35/043 | 210/390 |
| 827,780 | A | * | 8/1906 | Benoit | B01D 29/23 | 210/317 |
| 915,038 | A | * | 3/1909 | Perry et al. | B01D 35/043 | 210/418 |
| 953,637 | A | * | 3/1910 | Mccollom | B01D 35/043 | 210/451 |
| 966,181 | A | * | 8/1910 | Durbrow | B01D 35/043 | 210/423 |
| 1,021,076 | A | * | 3/1912 | Sisley | B01D 35/043 | 210/423 |
| 1,047,137 | A | * | 12/1912 | Berger | B01D 35/043 | 210/489 |
| 1,149,911 | A | * | 8/1915 | Harloe | B01D 35/02 | 210/402 |
| 1,162,455 | A | * | 11/1915 | Collins | B01D 17/0208 | 210/287 |
| 1,225,993 | A | * | 5/1917 | Mullaney | B01D 35/0276 | 210/477 |
| 1,275,463 | A | * | 8/1918 | Nicoll | B01D 35/027 | 210/462 |
| 1,303,438 | A | * | 5/1919 | Wiehl | B01D 29/111 | 210/493.5 |
| 1,337,061 | A | * | 4/1920 | Forrest, Jr. | B01D 24/165 | 210/418 |
| 1,401,970 | A | * | 1/1922 | Egle | B01D 35/043 | 210/443 |
| 1,411,972 | A | * | 4/1922 | Madden | B01D 35/043 | 210/423 |
| 1,446,572 | A | * | 2/1923 | Lightfoot | B01D 35/043 | 210/396 |
| 2,334,802 | A | * | 11/1943 | Zuckermann | B01D 35/04 | 210/284 |
| 2,582,388 | A | * | 1/1952 | Mansfield | B01D 35/04 | 210/283 |
| 3,519,134 | A | * | 7/1970 | Hassinger | C02F 1/003 | 210/449 |
| 3,757,814 | A | * | 9/1973 | Hill | C02F 1/003 | 137/268 |
| 3,760,951 | A | * | 9/1973 | Mansfield | B01D 35/02 | 210/460 |
| 3,853,761 | A | * | 12/1974 | McClory | B01D 35/043 | 210/100 |
| 4,147,631 | A | * | 4/1979 | Deines | C02F 1/003 | 210/288 |
| 4,172,796 | A | * | 10/1979 | Corder | F16K 11/083 | 210/281 |
| 4,212,743 | A | * | 7/1980 | Van Meter | B01D 27/08 | 210/443 |
| 4,218,013 | A | * | 8/1980 | Davison | B05B 7/2443 | D6/544 |
| 4,242,201 | A | * | 12/1980 | Stephens | C02F 1/42 | 210/287 |
| 4,264,036 | A | * | 4/1981 | Moore | E03B 9/20 | 239/444 |
| 4,351,727 | A | * | 9/1982 | Brogger | B01D 35/043 | 137/550 |
| 4,504,389 | A | * | 3/1985 | Rundzaitis | B01D 35/043 | 210/282 |
| 4,591,438 | A | * | 5/1986 | Tanabe | C02F 1/283 | 210/282 |
| 4,680,116 | A | * | 7/1987 | Kamiwada | C02F 1/003 | 210/423 |
| 4,686,037 | A | * | 8/1987 | Lang | C02F 1/003 | 210/336 |
| 4,732,674 | A | * | 3/1988 | Tamura | C02F 1/003 | 210/502.1 |
| 4,770,768 | A | * | 9/1988 | Lang | C02F 1/28 | 210/232 |
| 4,814,078 | A | * | 3/1989 | Stern | C02F 1/003 | 210/438 |
| 4,828,709 | A | * | 5/1989 | Houser | A47K 3/28 | 4/597 |
| 4,839,039 | A | * | 6/1989 | Parsons | A47K 5/1217 | 210/143 |
| 4,933,080 | A | * | 6/1990 | Rundzaitis | B01D 35/043 | 4/615 |
| 4,968,440 | A | * | 11/1990 | Woodruff | B01D 35/043 | 210/791 |
| 4,980,073 | A | * | 12/1990 | Woodruff | B01D 35/043 | 251/900 |
| D316,136 | S | * | 4/1991 | Underwood | D23/209 | |
| 5,008,011 | A | * | 4/1991 | Underwood | C02F 1/003 | 4/615 |
| 5,017,286 | A | * | 5/1991 | Heiligman | B01D 35/043 | 210/423 |
| 5,070,553 | A | * | 12/1991 | Chambers | E03C 1/06 | 4/615 |
| 5,078,176 | A | * | 1/1992 | Woodruff | B01D 35/043 | 251/312 |
| D326,896 | S | * | 6/1992 | McNeely | D23/213 | |
| 5,151,179 | A | * | 9/1992 | Bach | B01D 35/147 | 210/446 |
| 5,152,464 | A | * | 10/1992 | Farley | B05B 15/40 | 239/553.3 |
| 5,160,038 | A | * | 11/1992 | Harada | B01D 61/18 | 210/282 |
| 5,188,727 | A | * | 2/1993 | Kurth | C02F 1/003 | 210/85 |
| 5,192,427 | A | * | 3/1993 | Eger | E03C 1/046 | 210/232 |
| 5,192,436 | A | * | 3/1993 | Sasaki | C02F 1/003 | 137/562 |
| 5,194,156 | A | * | 3/1993 | Tomchak | E03C 1/08 | 285/8 |
| 5,213,688 | A | * | 5/1993 | Robinson | B01D 29/114 | 4/615 |
| 5,256,287 | A | * | 10/1993 | Underwood | B01D 35/043 | 210/443 |
| 5,385,667 | A | * | 1/1995 | Steger | C02F 1/003 | 4/615 |
| D358,868 | S | * | 5/1995 | Hembree | D23/209 | |
| D361,622 | S | * | 8/1995 | Farley | D23/209 | |
| D364,446 | S | * | 11/1995 | Farley | D23/209 | |
| 5,503,742 | A | * | 4/1996 | Farley | B01D 29/01 | 210/450 |

(56) References Cited

U.S. PATENT DOCUMENTS

| | | | | | | |
|---|---|---|---|---|---|---|
| 5,510,031 | A | * | 4/1996 | Knauf, Jr. | B01D 29/114 | 4/631 |
| 5,525,214 | A | * | 6/1996 | Hembree | B01D 35/043 | 222/14 |
| 5,527,451 | A | * | 6/1996 | Hembree | B01D 35/143 | 210/434 |
| 5,545,314 | A | * | 8/1996 | Parise | E03C 1/0409 | 4/615 |
| 5,549,822 | A | * | 8/1996 | Ferguson | B05B 15/20 | 210/287 |
| 5,628,900 | A | * | 5/1997 | Naito | B01D 24/12 | 210/287 |
| 5,653,868 | A | * | 8/1997 | Yanou | B01D 35/043 | 210/418 |
| RE35,667 | E | * | 11/1997 | Heiligman | C02F 1/283 | 210/423 |
| 5,685,981 | A | * | 11/1997 | Koslow | B01D 29/114 | 210/429 |
| 5,705,067 | A | * | 1/1998 | Sumi | C02F 1/003 | 210/234 |
| 5,766,462 | A | * | 6/1998 | Jones | B01D 35/043 | 137/625.48 |
| 5,772,119 | A | * | 6/1998 | Someya | C02F 9/20 | 4/615 |
| 5,795,471 | A | * | 8/1998 | Naito | C02F 1/281 | 210/283 |
| D398,369 | S | * | 9/1998 | Hayes | D23/209 | |
| D398,703 | S | * | 9/1998 | Hayes | D23/209 | |
| 5,833,849 | A | * | 11/1998 | Primdahl | B01D 35/04 | 285/8 |
| 5,876,600 | A | * | 3/1999 | Matsubara | B01D 35/30 | 210/DIG. 17 |
| 5,888,381 | A | * | 3/1999 | Primdahl | B01D 61/18 | 200/81.9 R |
| D410,728 | S | * | 6/1999 | Kurth | D23/209 | |
| 5,928,504 | A | * | 7/1999 | Hembre | B01D 35/143 | 222/14 |
| 5,935,426 | A | * | 8/1999 | Giordano | C02F 1/003 | 210/138 |
| 5,975,434 | A | * | 11/1999 | Douglas | B05B 15/40 | 210/449 |
| 5,976,362 | A | * | 11/1999 | Wadsworth | B01D 17/12 | 210/100 |
| 5,989,425 | A | * | 11/1999 | Yonezawa | F16K 11/056 | 210/282 |
| D417,904 | S | * | 12/1999 | Douglas | D23/209 | |
| 6,006,374 | A | * | 12/1999 | Winnett | E03C 1/046 | 4/525 |
| 6,096,197 | A | * | 8/2000 | Hughes | C02F 1/003 | 4/615 |
| 6,106,705 | A | * | 8/2000 | Giordano | C02F 9/20 | 73/861.78 |
| 6,123,837 | A | * | 9/2000 | Wadsworth | B01D 35/046 | 210/100 |
| 6,135,154 | A | * | 10/2000 | Chen | B01D 35/04 | 137/625.29 |
| 6,149,801 | A | * | 11/2000 | Giordano | B01D 21/34 | 73/861.78 |
| 6,183,636 | B1 | * | 2/2001 | Bowers | E03C 1/0404 | 210/232 |
| 6,187,187 | B1 | * | 2/2001 | Farley | C02F 1/003 | 210/287 |
| 6,214,224 | B1 | * | 4/2001 | Farley | B05B 15/65 | 210/282 |
| 6,241,103 | B1 | * | 6/2001 | Hembree | B01D 35/147 | 210/446 |
| 6,251,274 | B1 | * | 6/2001 | Shepherd | B01D 35/04 | 210/420 |
| 6,258,266 | B1 | * | 7/2001 | Riback | B01D 35/043 | 210/234 |
| 6,267,887 | B1 | * | 7/2001 | Hughes | C02F 1/003 | 210/443 |
| D446,841 | S | * | 8/2001 | Silva | D23/209 | |
| 6,284,129 | B1 | * | 9/2001 | Giordano | G01F 1/075 | 210/138 |
| 6,325,930 | B2 | * | 12/2001 | Farley | B05B 15/40 | 210/282 |
| 6,372,132 | B1 | * | 4/2002 | Williams | C02F 1/003 | 210/450 |
| D457,596 | S | * | 5/2002 | Guzman | D23/209 | |
| 6,457,589 | B1 | * | 10/2002 | Poirier | C02F 1/003 | 210/287 |
| 6,464,869 | B1 | * | 10/2002 | Hsu | B01D 35/04 | 210/418 |
| 6,464,871 | B1 | * | 10/2002 | Chang | C02F 1/003 | 210/418 |
| 6,517,707 | B2 | * | 2/2003 | Giordano | B01D 17/0208 | 210/94 |
| 6,571,960 | B2 | * | 6/2003 | Williamson | B01D 29/56 | 210/85 |
| D477,382 | S | * | 7/2003 | Strand | D23/209 | |
| 6,599,428 | B1 | * | 7/2003 | Douglas | C02F 1/281 | 210/283 |
| 6,626,378 | B2 | * | 9/2003 | Sasaki | A47K 3/40 | 239/553 |
| 6,641,717 | B2 | * | 11/2003 | Okano | B01D 29/603 | 210/93 |
| 6,796,518 | B2 | * | 9/2004 | Douglas | B05B 15/40 | 239/436 |
| 6,797,156 | B2 | * | 9/2004 | Chau | B01D 35/04 | 210/138 |
| D498,511 | S | * | 11/2004 | Warren | D23/209 | |
| D498,512 | S | * | 11/2004 | Warren | D23/209 | |
| 6,881,333 | B2 | * | 4/2005 | Ozeki | B01D 35/143 | 210/232 |
| 6,926,821 | B2 | * | 8/2005 | Giordano | B01D 21/2405 | 210/138 |
| 6,951,286 | B2 | * | 10/2005 | Mueller | B05B 15/40 | 210/461 |
| RE39,142 | E | * | 6/2006 | Farley | B05B 15/65 | 210/449 |
| 7,094,334 | B1 | * | 8/2006 | Guzman | C02F 1/003 | 210/138 |
| 7,097,122 | B1 | * | 8/2006 | Farley | E03C 1/0409 | 239/587.5 |
| D533,622 | S | * | 12/2006 | Ross | D23/209 | |
| 7,143,897 | B1 | * | 12/2006 | Guzman | B01D 35/04 | 4/596 |
| D536,419 | S | * | 2/2007 | O'Brien | D23/228 | |
| D541,372 | S | * | 4/2007 | Warren | D23/209 | |
| D543,608 | S | * | 5/2007 | O'Brien | D23/228 | |
| D544,944 | S | * | 6/2007 | Li | D23/213 | |
| 7,252,757 | B2 | * | 8/2007 | Warren | B01D 27/101 | 210/138 |
| 7,258,781 | B2 | * | 8/2007 | Warren | B01D 27/08 | 210/138 |
| 7,326,334 | B2 | * | 2/2008 | Boyd | B01D 35/04 | 210/419 |
| 7,338,594 | B2 | * | 3/2008 | Lackey | B01D 35/143 | 210/85 |
| 7,427,352 | B2 | * | 9/2008 | Naito | C02F 1/481 | 210/284 |
| 7,490,372 | B2 | * | 2/2009 | Huang | B05B 15/65 | 285/46 |
| 7,617,939 | B2 | * | 11/2009 | Klump | C02F 1/001 | 137/562 |
| 7,650,830 | B1 | * | 1/2010 | Lessis | A47J 31/605 | 222/145.5 |
| 7,682,513 | B2 | * | 3/2010 | Wang | C02F 1/70 | 210/749 |
| 7,717,270 | B2 | * | 5/2010 | Boyd | B01D 35/04 | 210/423 |
| 7,810,650 | B2 | * | 10/2010 | Ennis | C02F 9/20 | 210/85 |
| 7,866,576 | B1 | * | 1/2011 | Farley | E03C 1/0409 | 239/587.5 |
| D638,514 | S | * | 5/2011 | Farley | D23/209 | |
| D638,515 | S | * | 5/2011 | Farley | D23/209 | |

(56) References Cited

U.S. PATENT DOCUMENTS 8,152,142 B2 * 4/2012 Hirakui .................. C02F 1/481
261/84
D665,474 S * 8/2012 Farley .................. D23/209
D667,077 S * 9/2012 Stanley .................. D23/209
D667,925 S * 9/2012 Farley .................. D23/209
D667,926 S * 9/2012 Farley .................. D23/209
8,268,168 B2 * 9/2012 Mang .................. C02F 1/003
210/236
8,372,275 B2 * 2/2013 Lackey .................. C02F 1/003
210/418
8,518,255 B2 * 8/2013 Sasaki .................. C02F 1/003
210/313
8,888,998 B2 * 11/2014 Swain .................. B01D 35/147
210/90
8,961,788 B2 * 2/2015 Stanley .................. C02F 1/003
210/283
9,004,290 B2 * 4/2015 Tanner .................. F16L 15/00
137/868
9,068,327 B2 * 6/2015 Granstrand .................. G01F 5/00
9,410,309 B2 * 8/2016 Sharratt .................. E03C 1/066
9,604,857 B2 * 3/2017 Sasaki .................. B01D 29/01
9,802,843 B2 * 10/2017 Chang .................. C02F 1/48
9,878,921 B2 * 1/2018 Hunter .................. B05B 12/008
10,106,435 B2 * 10/2018 Chau .................. C02F 1/283
10,124,350 B2 * 11/2018 Cai .................. C02F 1/003
10,125,026 B2 * 11/2018 Tanner .................. F16L 15/00
10,159,991 B2 * 12/2018 Sharratt .................. B05B 15/40
10,183,869 B2 * 1/2019 Floyd .................. C02F 1/003
10,252,197 B2 * 4/2019 Chernov .................. B01D 35/04
10,309,083 B2 * 6/2019 Barrett .................. B01F 21/221
10,350,522 B2 * 7/2019 Lin .................. B01D 35/30
D861,128 S * 9/2019 Ye .................. D23/209
10,518,201 B2 * 12/2019 Farley .................. A01M 7/005
10,737,203 B2 * 8/2020 Farley .................. B01D 24/06
D903,048 S * 11/2020 Lu .................. D23/209
11,192,134 B2 * 12/2021 Farley .................. C02F 1/003
11,247,154 B2 * 2/2022 Lin .................. B01D 27/08
11,266,932 B2 * 3/2022 Benson .................. C02F 1/003
11,440,813 B2 * 9/2022 Tanner .................. B01D 35/30
11,458,487 B2 * 10/2022 Farley .................. B05B 15/40
11,465,919 B2 * 10/2022 Farley .................. C02F 1/281
11,649,619 B2 * 5/2023 Awada .................. C02F 1/003
210/446
D1,006,186 S * 11/2023 Mishan .................. D23/209
11,951,418 B2 * 4/2024 Hoenderkamp .... F24D 19/0092
11,976,448 B2 * 5/2024 Shin .................. E03C 1/04
12,090,429 B1 * 9/2024 Su .................. B01D 39/1623
12,103,019 B1 * 10/2024 Zhou .................. B01D 29/13
D1,050,348 S * 11/2024 Guo .................. D23/209
D1,051,290 S * 11/2024 Guo .................. D23/209
D1,062,989 S * 2/2025 Genin .................. D23/209
D1,073,013 S * 4/2025 Zhao .................. D23/209
12,320,105 B2 * 6/2025 You .................. B01D 35/04
12,351,479 B2 * 7/2025 Hu .................. F16K 35/04
D1,103,335 S * 11/2025 Orlic .................. B01D 35/30
D23/209
12,458,912 B2 * 11/2025 Morehouse, III ...... B01D 29/15
12,496,546 B2 * 12/2025 Louison ............. B01D 46/2414
12,529,214 B2 * 1/2026 Liu .................. E03C 1/0408
12,534,389 B2 * 1/2026 Ma .................. C02F 1/003
D1,112,607 S * 2/2026 Ma .................. D23/209
12,540,083 B1 * 2/2026 Zhang .................. C02F 1/003
D1,120,208 S * 3/2026 Liu .................. D23/213
12,564,847 B1 * 3/2026 Su .................. B05B 1/189
12,564,856 B1 * 3/2026 Zhou .................. B05B 15/40
12,576,350 B2 * 3/2026 Molina .................. B01D 35/06
12,594,562 B2 * 4/2026 Ball .................. B05B 1/3026
12,599,859 B1 * 4/2026 Su .................. B01D 39/2065
12,600,650 B2 * 4/2026 Lee .................. C02F 1/48
D1,126,355 S * 5/2026 Wang .................. D23/209
D1,127,146 S * 5/2026 Ma .................. D23/209
12,629,618 B2 * 5/2026 Hu .................. B01D 35/04
12,631,011 B2 * 5/2026 Johnson ................ E03C 1/0404
2001/0037970 A1 * 11/2001 Farley .................. E03C 1/08
210/435
2001/0040121 A1 * 11/2001 Giordano .............. B01D 21/30
210/138
2001/0054583 A1 * 12/2001 Hembree .............. B01D 24/04
210/449
2002/0005379 A1 * 1/2002 Willamson ........... B01D 35/046
210/341
2003/0034285 A1 * 2/2003 Hembree ............ B01D 35/043
210/473
2003/0034405 A1 * 2/2003 Hsieh .................. B05B 1/18
239/537
2003/0062300 A1 * 4/2003 Okano .................. C02F 1/003
210/443
2003/0116495 A1 * 6/2003 Chau .................. B01D 35/04
210/264
2003/0173273 A1 * 9/2003 Giordano ............... G01F 1/075
210/138
2003/0222013 A1 * 12/2003 Yang .................. B01D 35/04
210/435
2004/0026302 A1 * 2/2004 Lee .................. B01D 29/96
210/287
2004/0056123 A1 * 3/2004 Douglas ............... B05B 1/1654
239/587.4
2004/0069695 A1 * 4/2004 Isobe .................. B01D 35/143
210/138
2004/0069696 A1 * 4/2004 Warren ............... B01D 27/101
210/97
2004/0069719 A1 * 4/2004 Wang .................. C02F 1/70
210/206
2004/0255377 A1 * 12/2004 Mueller ................ B05B 15/40
4/615
2004/0256303 A1 * 12/2004 Talbot .................. B01D 35/04
210/232
2005/0035054 A1 * 2/2005 Chu .................. C02F 1/003
210/460
2005/0035228 A1 * 2/2005 Douglas ................ C02F 1/003
239/436
2005/0092661 A1 * 5/2005 Warren ............... B01D 27/101
210/450
2005/0098485 A1 * 5/2005 Boyd .................. E03C 1/08
210/100
2005/0126974 A1 * 6/2005 Naito .................. C02F 1/481
210/284
2005/0126975 A1 * 6/2005 Naito .................. C02F 1/481
210/284
2005/0155165 A1 * 7/2005 Tsai .................. B01D 35/26
15/1.7
2006/0032792 A1 * 2/2006 Warren ............... B01D 27/005
210/138
2006/0032793 A1 * 2/2006 Warren ................ B01D 35/30
210/138
2006/0032794 A1 * 2/2006 Warren ................ B01D 35/04
210/138
2006/0032795 A1 * 2/2006 Warren ............... B01D 35/143
210/138
2006/0037893 A1 * 2/2006 Warren ............... B01D 35/143
210/94
2006/0076280 A1 * 4/2006 Warren ............... B01D 27/005
210/418
2006/0108267 A1 * 5/2006 Warren ................ B01D 27/08
210/450
2006/0207920 A1 * 9/2006 Lackey ............... B01D 35/143
210/95
2006/0243654 A1 * 11/2006 Lee .................. C02F 1/003
210/94
2007/0006380 A1 * 1/2007 Huang .................. E03C 1/042
4/615
2007/0023332 A1 * 2/2007 Fan .................. C02F 1/003
210/85
2007/0151919 A1 * 7/2007 Klump .................. C02F 1/004
210/418
2007/0235381 A1 * 10/2007 Tsai .................. C02F 1/003
210/287
2008/0011656 A1 * 1/2008 Lacy .................. C02F 1/003
210/232

(56) References Cited

U.S. PATENT DOCUMENTS

| | | | | |
|---|---|---|---|---|
| 2008/0035552 | A1* | 2/2008 | Lee | C02F 1/003 210/446 |
| 2009/0090661 | A1* | 4/2009 | Tanner | B01D 35/30 285/8 |
| 2009/0107906 | A1* | 4/2009 | Ennis | C02F 9/20 210/238 |
| 2009/0134079 | A1* | 5/2009 | Boyd | B01D 35/04 210/137 |
| 2009/0301975 | A1* | 12/2009 | Timmer | B01D 35/30 210/446 |
| 2010/0001418 | A1* | 1/2010 | Hirakui | A61L 2/183 261/35 |
| 2010/0206799 | A1* | 8/2010 | Leavitt | C02F 1/002 210/314 |
| 2011/0147286 | A1* | 6/2011 | Mang | E03C 1/066 210/236 |
| 2011/0226679 | A1* | 9/2011 | Lackey | C02F 1/003 210/85 |
| 2011/0297624 | A1* | 12/2011 | Smith | C02F 1/003 210/232 |
| 2011/0315262 | A1* | 12/2011 | Butler | C02F 1/008 138/109 |
| 2011/0320134 | A1* | 12/2011 | Butler | C02F 1/008 702/25 |
| 2012/0006729 | A1* | 1/2012 | Hatakeyama | B01D 27/08 210/85 |
| 2012/0031511 | A1* | 2/2012 | Farley | E03C 1/0408 137/544 |
| 2012/0031821 | A1* | 2/2012 | Swain | B01D 35/30 210/232 |
| 2012/0055886 | A1* | 3/2012 | Hunter | B01D 35/153 210/85 |
| 2012/0055888 | A1* | 3/2012 | Hunter | A47K 3/286 210/767 |
| 2012/0255623 | A1* | 10/2012 | Bell | C02F 1/003 137/268 |
| 2012/0255895 | A1* | 10/2012 | Sasaki | C02F 1/003 210/393 |
| 2013/0168309 | A1* | 7/2013 | Loniewski | E03C 1/0404 210/418 |
| 2013/0319929 | A1* | 12/2013 | Farley, Jr. | B01D 24/165 210/444 |
| 2013/0334116 | A1* | 12/2013 | Stanley | E03C 1/046 210/232 |
| 2015/0068987 | A1* | 3/2015 | Bassett | C02F 1/003 210/433.1 |
| 2015/0076254 | A1* | 3/2015 | Farley | E03C 1/06 239/532 |
| 2015/0175441 | A1* | 6/2015 | Tanner | C02F 1/003 285/390 |
| 2015/0360150 | A1* | 12/2015 | Hatakeyama | B01D 27/08 210/94 |
| 2016/0016817 | A1* | 1/2016 | Chau | B05B 1/18 210/275 |
| 2016/0152488 | A1* | 6/2016 | Sasaki | C02F 1/003 210/235 |
| 2016/0236118 | A1* | 8/2016 | Sharratt | B05B 15/40 |
| 2016/0236945 | A1* | 8/2016 | Floyd | C02F 1/003 |
| 2016/0319526 | A1* | 11/2016 | Xie | C02F 1/003 |
| 2017/0144090 | A1* | 5/2017 | Lin | C02F 1/003 |
| 2017/0158531 | A1* | 6/2017 | Chang | B01D 35/30 |
| 2017/0239680 | A1* | 8/2017 | Hunter | B05B 15/40 |
| 2017/0326561 | A1* | 11/2017 | Sharratt | B05B 15/40 |
| 2018/0133630 | A1* | 5/2018 | Huat | E03C 1/0409 |
| 2018/0133739 | A1* | 5/2018 | Huat | B01D 35/04 |
| 2018/0161711 | A1* | 6/2018 | Chernov | B01D 35/04 |
| 2018/0207563 | A1* | 7/2018 | Benson | B01D 35/306 |
| 2019/0127235 | A1* | 5/2019 | Tanner | F16L 15/00 |
| 2019/0160401 | A1* | 5/2019 | Farley | B01D 35/04 |
| 2019/0184316 | A1* | 6/2019 | Farley | B01D 35/02 |
| 2019/0329167 | A1* | 10/2019 | Lin | B01D 35/30 |
| 2020/0157789 | A1* | 5/2020 | Awada | C02F 1/003 |
| 2020/0247700 | A1* | 8/2020 | Genin | C02F 1/003 |
| 2020/0270146 | A1* | 8/2020 | Farley | B05B 1/18 |
| 2020/0316632 | A1* | 10/2020 | Farley | B05B 1/18 |
| 2020/0377384 | A1* | 12/2020 | Farley | C02F 1/281 |
| 2020/0384485 | A1* | 12/2020 | Farley | E03C 1/0409 |
| 2021/0380447 | A1* | 12/2021 | Song | C02F 1/688 |
| 2022/0249987 | A1* | 8/2022 | Oh | B01D 35/04 |
| 2022/0259067 | A1* | 8/2022 | Hu | F16K 27/045 |
| 2022/0341137 | A1* | 10/2022 | You | B01D 35/04 |
| 2023/0075444 | A1* | 3/2023 | Ye | E03C 1/023 |
| 2023/0193605 | A1* | 6/2023 | Shin | B01D 29/03 4/619 |
| 2023/0303415 | A1* | 9/2023 | Hu | C02F 1/42 |
| 2023/0347372 | A1* | 11/2023 | Yu | B05B 15/40 |
| 2023/0382764 | A1* | 11/2023 | Guo | C02F 1/003 |
| 2024/0025765 | A1* | 1/2024 | Carosi | E03C 1/0408 |
| 2024/0033664 | A1* | 2/2024 | Hu | B01D 35/04 |
| 2024/0050879 | A1* | 2/2024 | Zou | B01D 35/153 |
| 2024/0066442 | A1* | 2/2024 | Chaudoin | B01D 39/2055 |
| 2024/0115979 | A1* | 4/2024 | Zhadanov | B01D 35/1475 |
| 2024/0116776 | A1* | 4/2024 | Zhadanov | B01D 35/1475 |
| 2024/0268343 | A1* | 8/2024 | Bae | A01K 13/001 |
| 2024/0299716 | A1* | 9/2024 | Vidal | C02F 9/20 |
| 2024/0327243 | A1* | 10/2024 | Ma | C02F 1/003 |
| 2024/0337094 | A1* | 10/2024 | Liu | E03C 1/0408 |
| 2024/0342742 | A1* | 10/2024 | Farley | B01D 35/04 |
| 2025/0018408 | A1* | 1/2025 | Seidenfeld | B05B 1/18 |
| 2025/0025897 | A1* | 1/2025 | Zhou | C02F 1/003 |
| 2025/0270112 | A1* | 8/2025 | Hu | B01D 29/33 |
| 2025/0296018 | A1* | 9/2025 | Orlic | B01D 27/103 |
| 2025/0360521 | A1* | 11/2025 | Farley | B05B 1/18 |
| 2026/0049004 | A1* | 2/2026 | Huang | C02F 1/003 |

* cited by examiner

SHOWER WATER FILTRATION ASSEMBLIES

CROSS-REFERENCE TO RELATED APPLICATIONS

This application claims the benefit of priority from Chinese Patent Application No. 202310813209.9, filed on Jul. 4, 2023. The content of the aforementioned application, including any intervening amendments thereto, is incorporated herein by reference in its entirety.

TECHNICAL FIELD

The present disclosure relates to the technical field of shower filtration, in particular to a filtering device arranged outside a water outlet piece.

BACKGROUND

A water outlet piece, such as a shower, generally includes a handheld shower and an overhead shower, wherein the handheld shower includes a shower body and a hose, the shower body is connected with the hose, water is introduced into the shower body from the hose, and is sprayed through the shower body, and the shower body may be fixed to the wall by a wall mount; the overhead shower includes a water inlet pipe and an overhead shower body, the water inlet pipe is fixed to the wall, and is connected with the overhead shower body, and water is introduced into the overhead shower body from the water inlet pipe, and is sprayed through the overhead shower body.

The shower is usually directly connected to a water heater, but all the water in the water heater comes from tap water, which will still contain impurities after disinfection. In addition, a portion of water will be stored in the water heater first, when the water heater is not in use, the water in the water heater will produce bacteria, and for a skin sensitive person, using tap water directly or water stored in the water heater for showering will cause discomfort to the skin. Therefore, it is necessary to filter the shower water to filter out impurities and bacteria to obtain clean and sanitary shower water.

However, in the related art, a shower filtering device is generally installed inside the handheld shower body or the overhead shower body, and when the shower needs to be replaced or maintained, the entire handheld shower body or overhead shower body needs to be disassembled for replacement and maintenance, which is costly. Alternatively, the shower filtering device is installed inside a pipeline through which the handheld shower body or the overhead shower body is connected to the water inlet pipe or between pipelines for filtering, and such a structure also has great inconvenience during maintenance and is inconvenient for periodic replacement; in the meantime, if the shower filtering device is applied to the overhead shower structure, the height of the overhead shower can only be lowered since the filtering device needs to be additionally installed, which will affect the use height and limit the installation environment.

SUMMARY

The present disclosure aims to solve one of the technical problems in the above-mentioned technology at least to some extent. To this end, an object of the present disclosure is to provide a filtering device arranged outside a water outlet piece, so that a filtering assembly is convenient to replace and low in maintenance cost, the installation is not easy to limit, and the adaptability is high.

In order to achieve the above object, an embodiment of the present disclosure provides a filtering device arranged outside a water outlet piece, including:

- a communication seat, including a water inlet portion, a water outlet portion and a water-passing communication portion, wherein the communication seat is provided with a water inlet channel and a water outlet channel which are independent from each other and do not communicate, the water inlet channel runs through from the water inlet portion to the water-passing communication portion, and the water outlet channel runs through from the water-passing communication portion to the water outlet portion; the water inlet portion is configured to be connected to a water inlet pipe, and the water outlet portion is configured to be connected to a water outlet piece; and
- a filtering assembly, connected with the water-passing communication portion of the communication seat and including a filter element, wherein a water inlet end of the filter element communicates with the water inlet channel of the communication seat, and a water outlet end of the filter element communicates with the water outlet channel of the communication seat.

When the filtering device arranged outside a water outlet piece according to the embodiment of the present disclosure is in use, the water inlet portion of the communication seat is connected to the water inlet pipe, i.e., the water source, the water outlet portion of the communication seat is connected to the water outlet piece, such as a handheld shower or an overhead shower, and since the filtering assembly is connected with the water-passing communication portion of the communication seat, and the filtering assembly is installed at the side of the communication seat, that is, the filtering assembly is installed outside the joint between the water inlet pipe and the water outlet piece, the filtering assembly is convenient to replace and low in maintenance cost, and the installation is not easy to limit, and the height of the overhead shower will not be affected even if the filtering device is used in an overhead shower environment, so that the adaptability is high.

In addition, the filtering device arranged outside a water outlet piece according to the above embodiment of the present disclosure may also have the following additional features:

optionally, the filtering assembly further includes a housing, wherein the filter element is placed in the housing, a first water channel and a second water channel which are separated from each other are formed between the filter element and the housing, the first water channel enables the water inlet channel of the communication seat to communicate with the water inlet end of the filter element, and the second water channel enables the water outlet end of the filter element to communicate with the water outlet channel of the communication seat.

Specifically, the filtering assembly further includes an inner bracket, wherein the inner bracket is of a cavity structure formed by a bottom plate and a side plate surrounding the bottom plate, and the bottom plate is provided with a water-passing hole; the housing is composed of an upper housing and a lower housing, and the inner bracket is placed in the lower housing; the filter element is placed in the inner bracket, and the water outlet end of the filter element communicates with the water-passing hole of the inner bracket; the first water channel is formed between the filter element and the upper housing, and the second water channel is formed between the inner bracket and the lower housing.

Further, an inner side wall of the water-passing communication portion of the communication seat is provided with a circumferential bump; an outer side wall of the lower housing extends radially to form a connecting portion, the connecting portion is provided with a circumferential chute, the circumferential chute is provided with an opening for allowing the circumferential bump to slide in, and the circumferential bump can slide into the circumferential chute through the opening and be limited in the circumferential chute so as to connect the filtering assembly with the communication seat.

Optionally, the filtering device arranged outside a water outlet piece further includes a connecting assembly, wherein the connecting assembly is arranged at the water inlet portion of the communication seat, and connects the water inlet pipe with the communication seat.

Specifically, the connecting assembly includes a connecting nut and a connector, wherein the connecting nut is provided with an axial accommodating through hole, and a side wall of the accommodating through hole is provided with an internal thread; the connector is partially placed in the accommodating through hole and partially extends out of the connecting nut so as to be inserted into the water inlet portion of the communication seat, and the connector is provided with a first water-passing channel in an axial direction so as to communicate with the water inlet channel.

Specifically, the filtering assembly is connected with the water-passing communication portion of the communication seat through a water diversion seat, one end of the water diversion seat is inserted into the filtering assembly, the other end of the water diversion seat is connected with a jaw and is inserted into the water-passing communication portion of the communication seat, and the jaw is inserted into a slot arranged on the connector; the water diversion seat is provided with a first connecting water channel and a second connecting water channel which are independent from each other and do not communicate, the first connecting water channel enables the water inlet channel to communicate with the water inlet end of the filter element, and the second connecting water channel enables the water outlet end of the filter element to communicate with the water outlet channel.

Further, the jaw and the water diversion seat are integrally formed or separately connected.

Specifically, the connecting assembly includes a connecting nut, a ball joint and a socket; the connecting nut is connected with the water inlet portion of the communication seat; the socket is partially inserted into the water inlet portion of the communication seat and partially placed in the connecting nut; the ball joint is partially limited in the connecting nut and partially extends out of the connecting nut; the ball joint and the socket are provided with second water-pas sing channels communicating with each other so as to communicate with the water inlet channel.

Optionally, the filtering assembly is connected with the water-passing communication portion of the communication seat through a water diversion seat, one end of the water diversion seat is inserted into the filtering assembly, the other end of the water diversion seat is connected with a snap and is inserted into the water-passing communication portion of the communication seat, and the snap is snapped onto the inner side wall of the water-passing communication portion; the water diversion seat is provided with a first connecting water channel and a second connecting water channel which are independent from each other and do not communicate, the first connecting water channel enables the water inlet channel to communicate with the water inlet end of the filter element, and the second connecting water channel enables the water outlet end of the filter element to communicate with the water outlet channel.

Optionally, the water outlet portion of the communication seat is integrally or separately connected with a threaded joint so as to be connected to the water outlet piece.

DESCRIPTION OF REFERENCE NUMERALS

Figure 1:
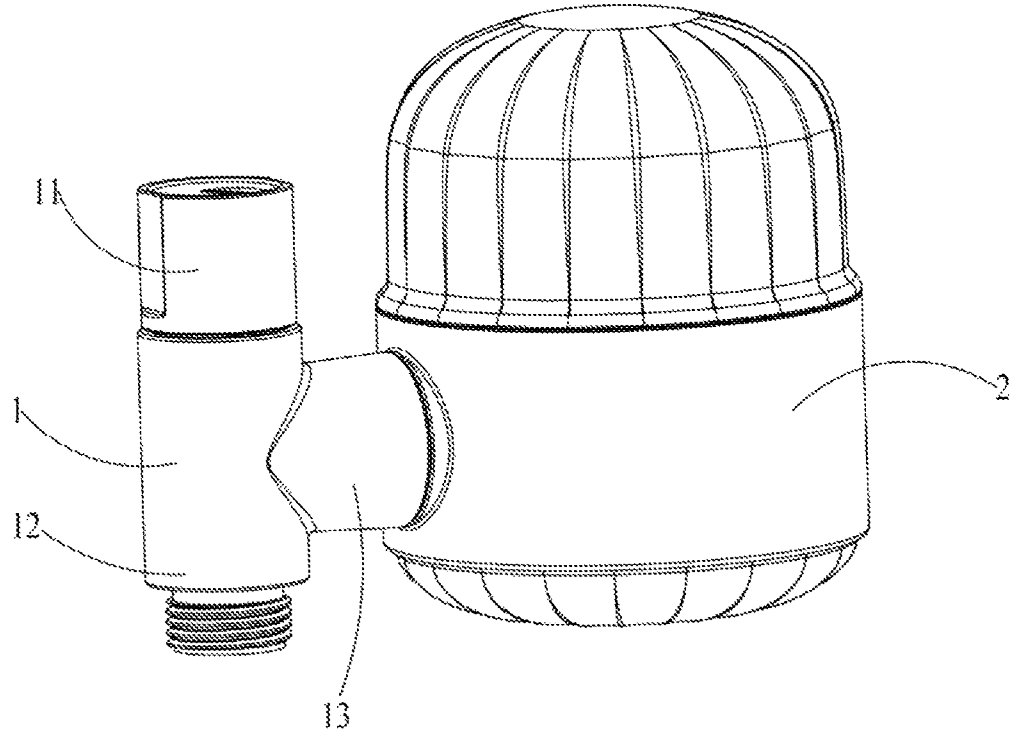
FIG. 1 is a three-dimensional assembled view of Embodiment 1 of the present disclosure.

1—communication seat, 11—water inlet portion, 12—water outlet portion, 13—water-passing communication portion, 131—circumferential bump, 14—water inlet channel, 15—water outlet channel, 16—baffle, 17—threaded joint, 2—filtering assembly, 21—filter element, 211—water inlet end, 212—water outlet end, 22—housing, 221—upper housing, 222—lower housing, 223—connecting portion, 224—circumferential chute, 225—opening, 23—first water channel, 24—second water channel, 25—inner bracket, 251—water-passing hole, 252—flange, 3—connecting assembly, 31—connecting nut, 311—accommodating through hole, 32—connector, 321—first water-passing channel, 322—slot, 33—connecting nut, 34—ball joint, 35—socket, 36—second water-passing channel, 4—water inlet pipe, 5—water outlet piece, 6—water diversion seat, 61—first connecting water channel, 62—second connecting water channel, 63—snap, and 7—jaw.

DETAILED DESCRIPTION

Hereinafter, embodiments of the present disclosure will be described in detail, examples of which are illustrated in the accompanying drawings, wherein the same or similar reference numerals indicate the same or similar elements or elements having the same or similar functions throughout. The embodiments described below by referring to the drawings are exemplary and are intended to explain the present disclosure, but not to be construed as limiting the present disclosure.

In order to better understand the above technical solutions, exemplary embodiments of the present disclosure will be described in more detail below with reference to the accompanying drawings. While exemplary embodiments of the present disclosure are illustrated in the accompanying drawings, it should be understood that the present disclosure may be implemented in various forms and should not be construed as limited to the embodiments set forth herein.

Rather, these embodiments are provided for a more thorough understanding of the present disclosure, and will fully convey the scope of the present disclosure to those skilled in the art.

Embodiment 1

As shown in FIGS. 1 to 6, a filtering device arranged outside a water outlet piece according to Embodiment 1 of the present disclosure includes a communication seat 1, a filtering assembly 2 and a connecting assembly 3.

The communication seat 1 includes a water inlet portion 11, a water outlet portion 12 and a water-passing communication portion 13, in this embodiment, the water inlet portion 11 and the water outlet portion 12 are axially coaxial, the water-passing communication portion 13 is perpendicular to the water inlet portion 11 and the water outlet portion 12, and the communication seat 1 is provided with a water inlet channel 14 and a water outlet channel 15 which are independent from each other and do not communicate. In this embodiment, the communication seat 1 is internally provided with a baffle 16, and the baffle 16 is located between the water inlet channel 14 and the water outlet channel 15 for blocking the water inlet channel 14 and the water outlet channel 15 so that the water inlet channel 14 does not communicate with the water outlet channel 15. The water inlet channel 14 runs through from the water inlet portion 11 to the water-passing communication portion 13, and the water outlet channel 15 runs through from the water-passing communication portion 13 to the water outlet portion 12. The water inlet portion 11 is configured to be connected to a water inlet pipe 4, and the water outlet portion 12 is configured to be connected to a water outlet piece 5. In this embodiment, the water outlet piece 5 is an overhead shower body.

The filtering assembly 2 is connected with the water-passing communication portion 13 of the communication seat 1, and includes a filter element 21, wherein a water inlet end 211 of the filter element 21 communicates with the water inlet channel 14 of the communication seat 1, and a water outlet end 212 of the filter element 21 communicates with the water outlet channel of the communication seat 1.

In this embodiment, the filtering assembly 2 further includes a housing 22, wherein the filter element 21 is placed in the housing 22, a first water channel 23 and a second water channel 24 which are separated from each other are formed between the filter element 21 and the housing 22, the first water channel 23 enables the water inlet channel 14 of the communication seat 1 to communicate with the water inlet end 211 of the filter element 21, and the second water channel 24 enables the water outlet end 212 of the filter element 21 to communicate with the water outlet channel 15 of the communication seat 1.

Specifically, the filtering assembly 2 further includes an inner bracket 25, wherein the inner bracket 25 is of a cavity structure formed by a bottom plate and a side plate surrounding the bottom plate, and the bottom plate is provided with water-passing holes 251; the housing 22 is composed of an upper housing 221 and a lower housing 222, the inner bracket 25 is placed in the lower housing 222, and the end of the side plate of the inner bracket 25 is provided with a radial flange 252 in sealing fit with the inner side wall of the lower housing 222. The filter element 21 is placed in the inner bracket 25, and the water outlet end 212 of the filter element 21 communicates with the water-passing holes 251 of the inner bracket 25. The first water channel 23 is formed between the filter element 21 and the upper housing 221, and the second water channel 24 is formed between the inner bracket 25 and the lower housing 222, and the first water channel 23 and the second water channel 24 are separated by the inner bracket 25.

Figure 4:
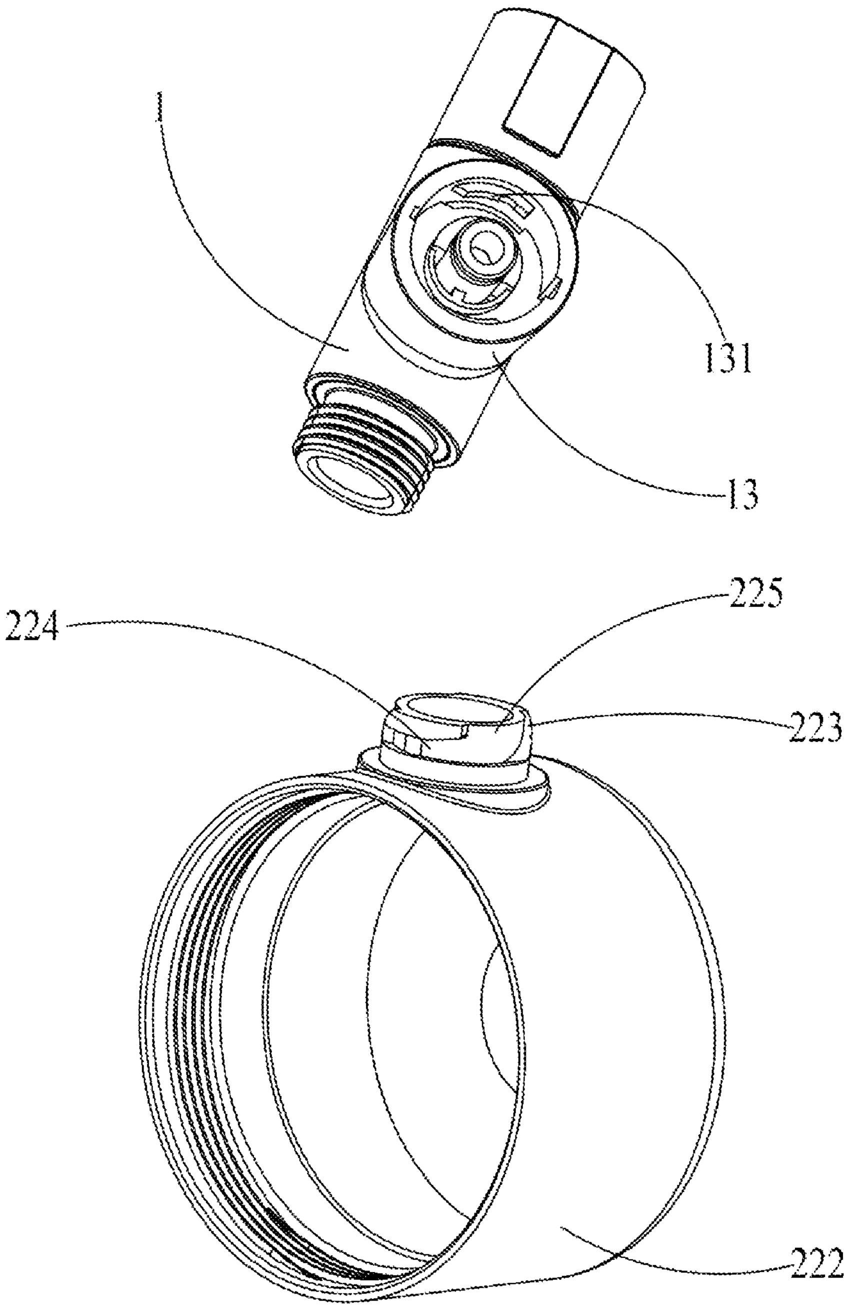
FIG. 4 is a partial assembly schematic diagram (assembly schematic diagram of a housing and a communication seat) of Embodiment 1 of the present disclosure.
Figure 5:
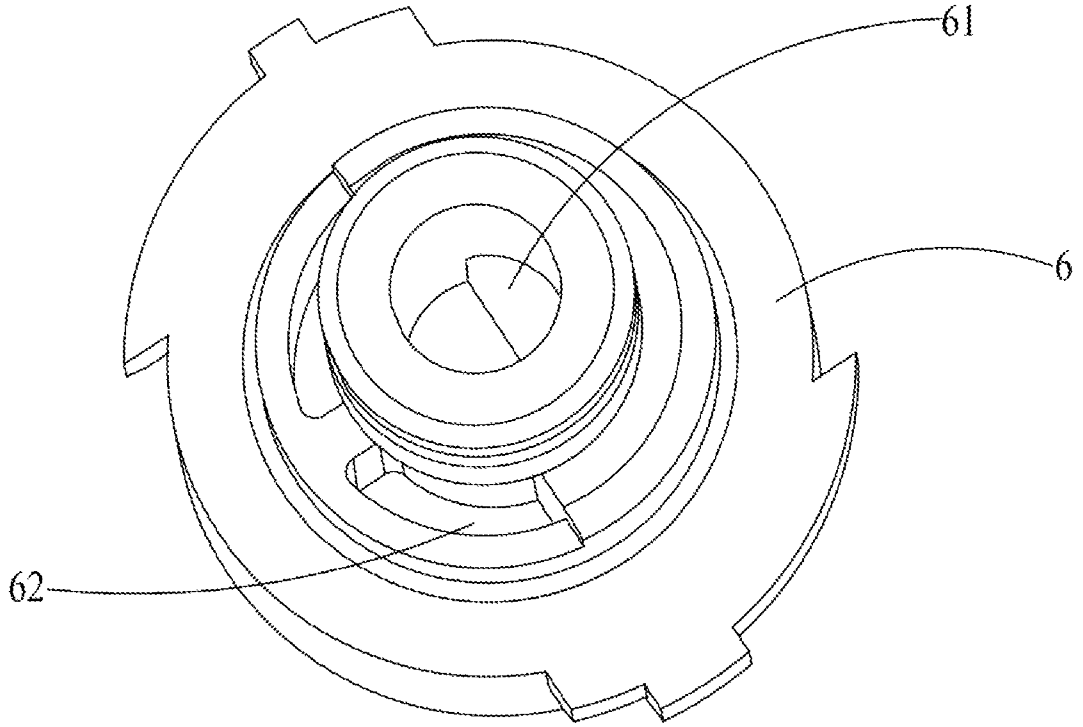
FIG. 5 is a structural schematic diagram of a water diversion seat according to Embodiment 1 of the present disclosure.
Figure 6:
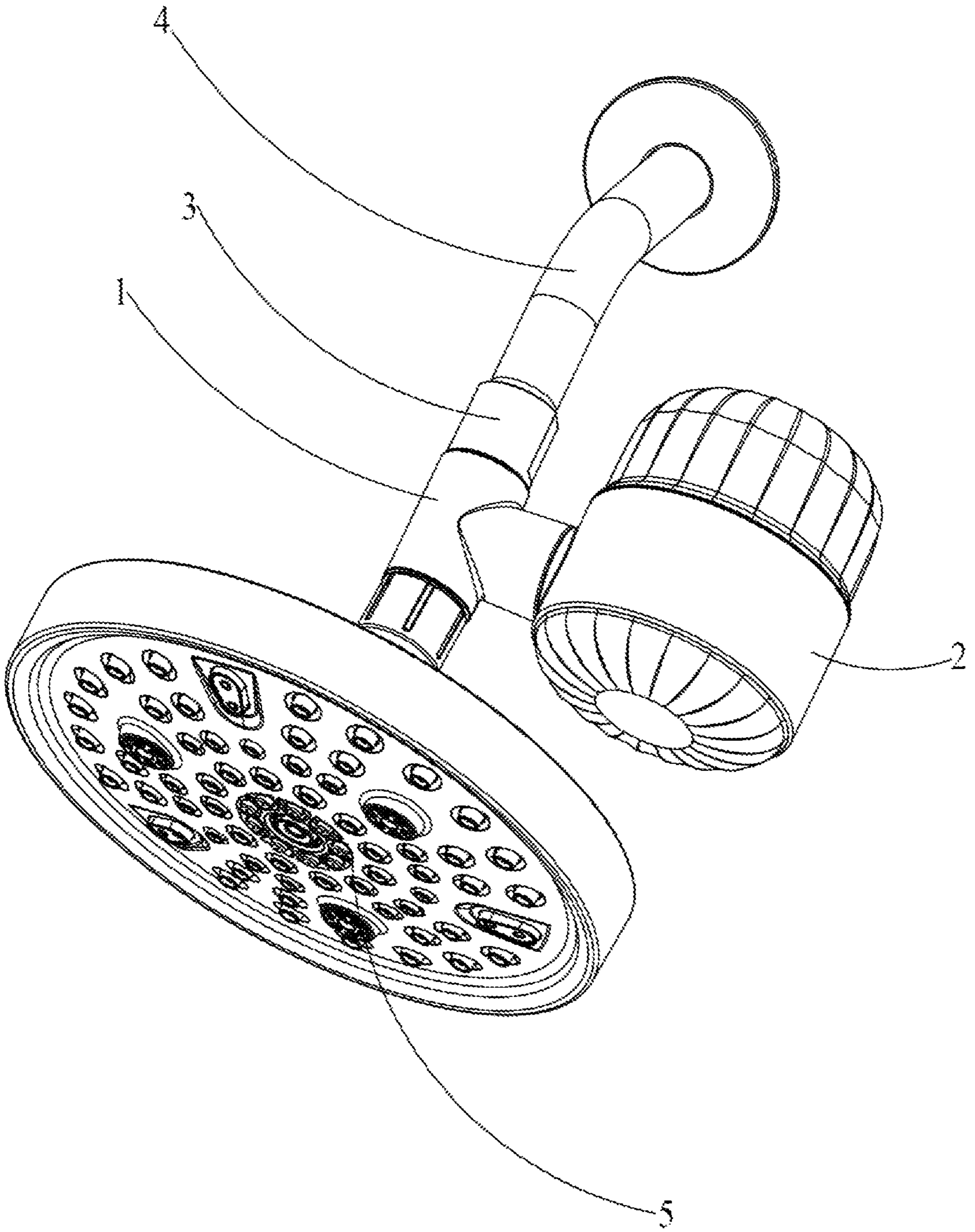
FIG. 6 is a usage state diagram of Embodiment 1 of the present disclosure.
Figure 7:
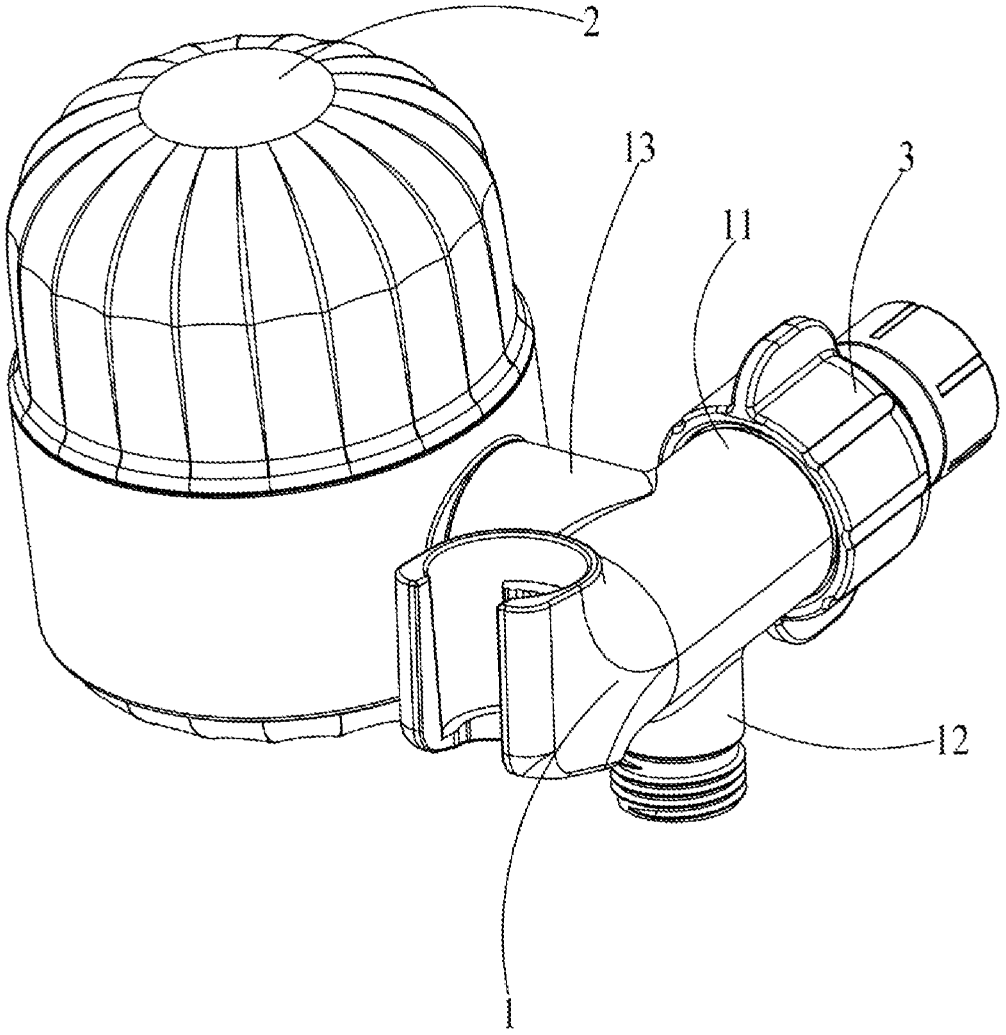
FIG. 7 is a three-dimensional assembled view of Embodiment 2 of the present disclosure.
Figure 8:
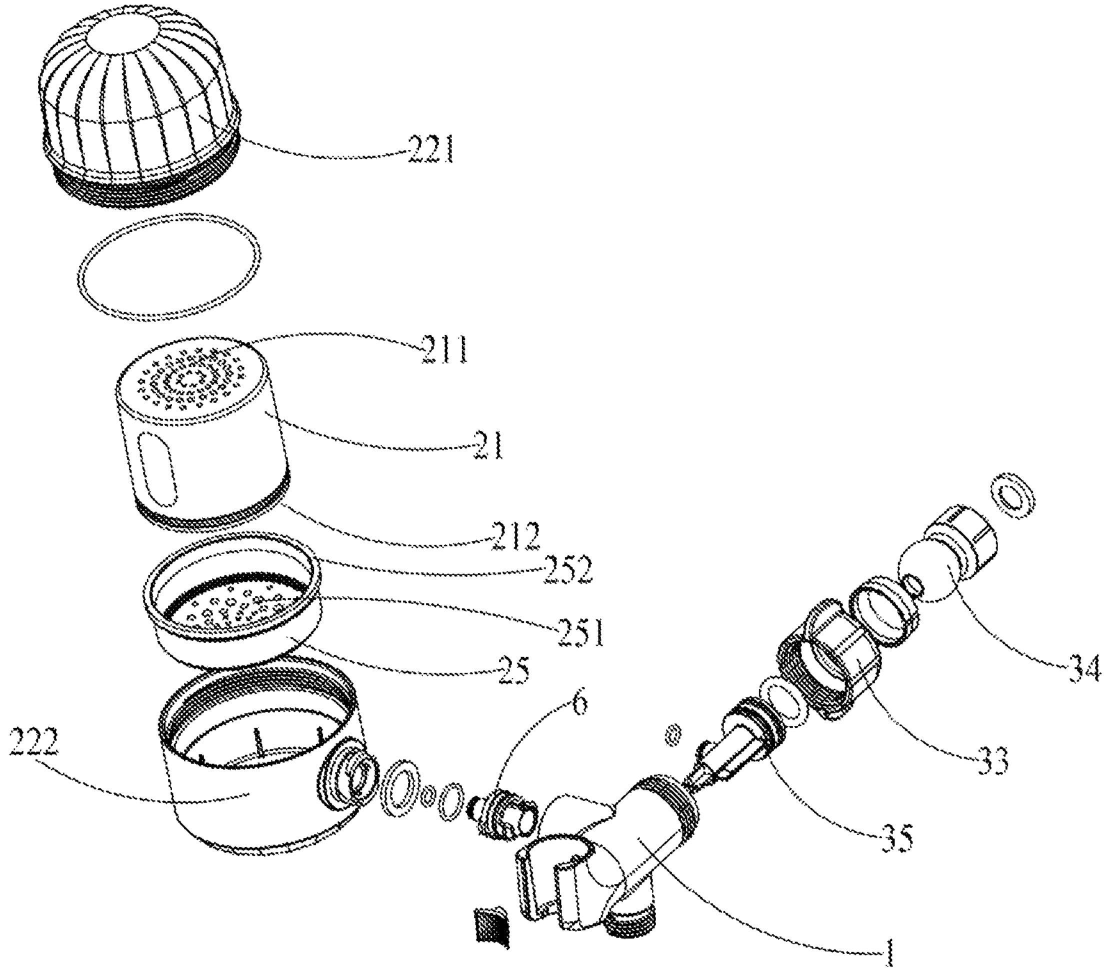
FIG. 8 is a three-dimensional exploded view of Embodiment 2 of the present disclosure.
Figure 9:
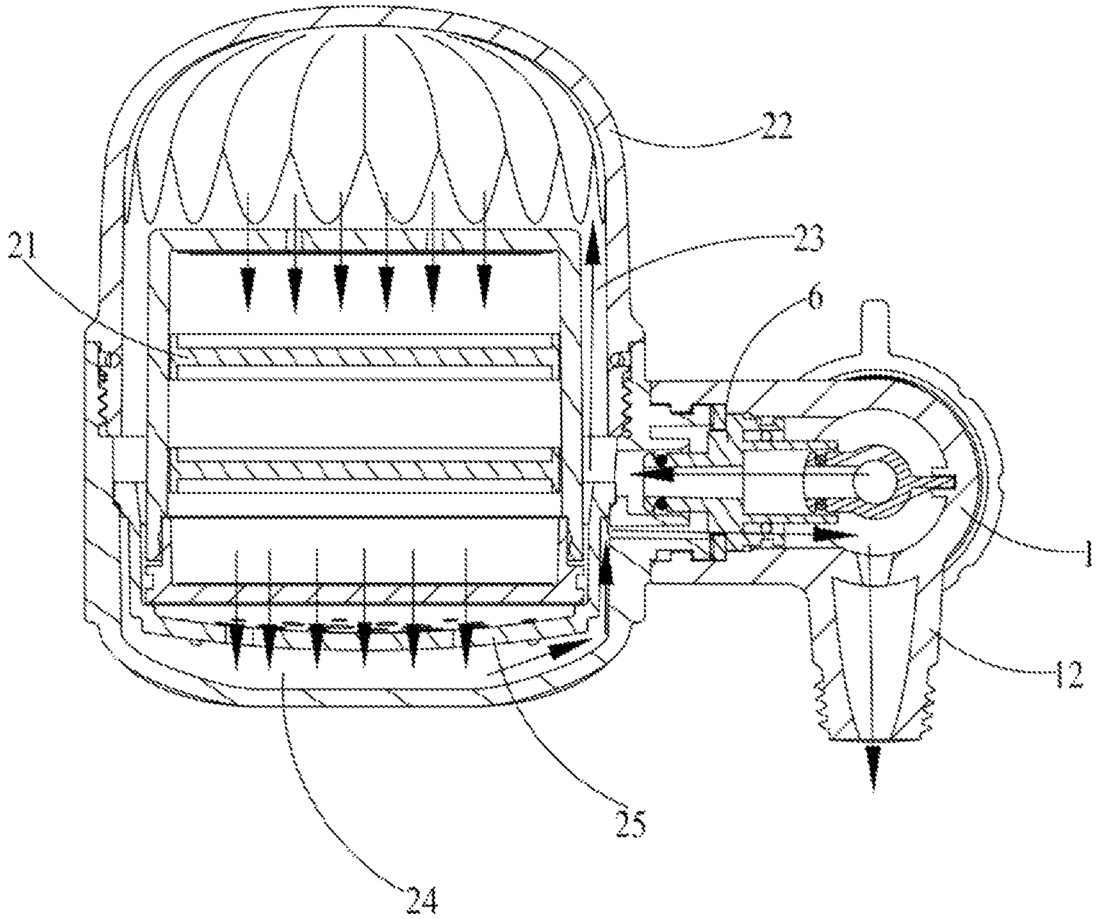
FIG. 9 is a waterway diagram of Embodiment 2 of the present disclosure.
Figure 10:
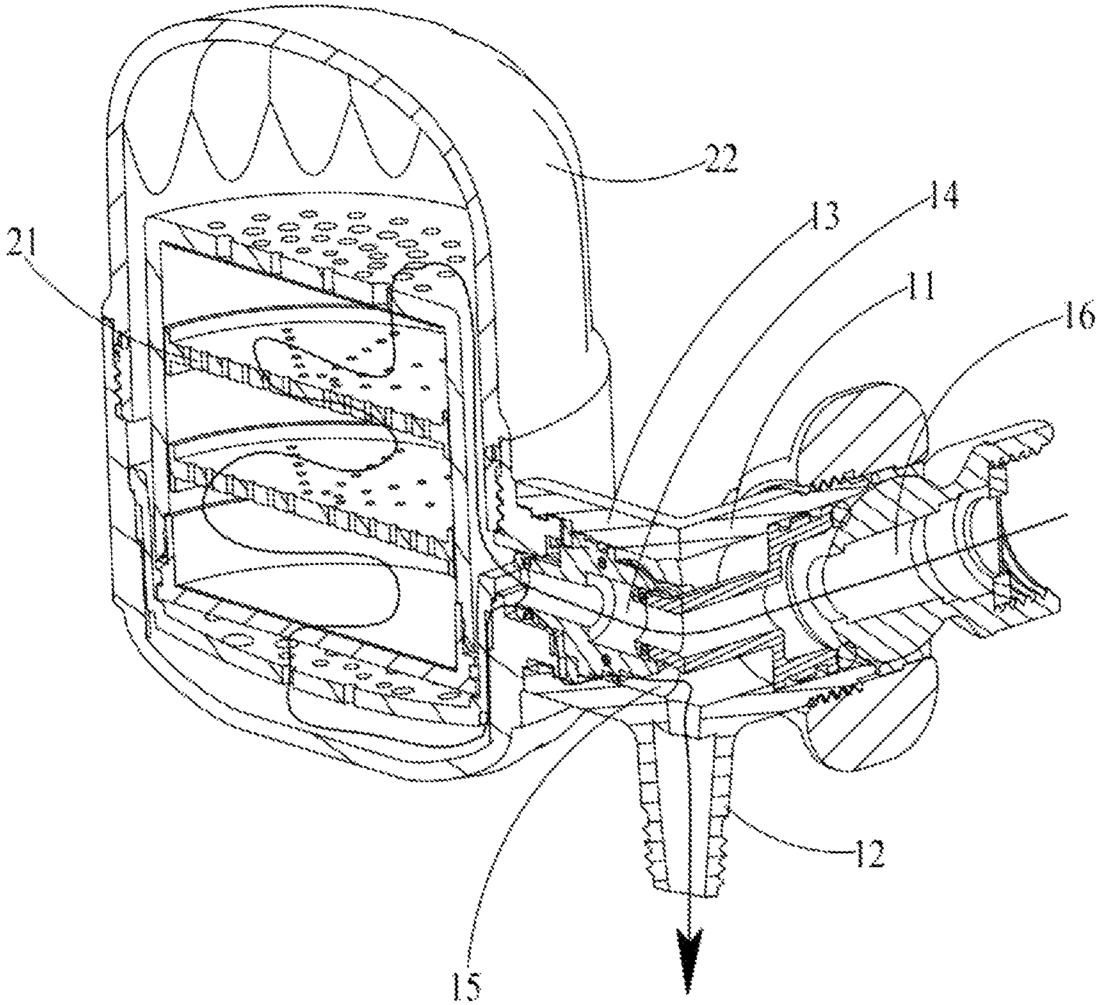
FIG. 10 is a first cross-sectional view of Embodiment 2 of the present disclosure.
Figure 11:
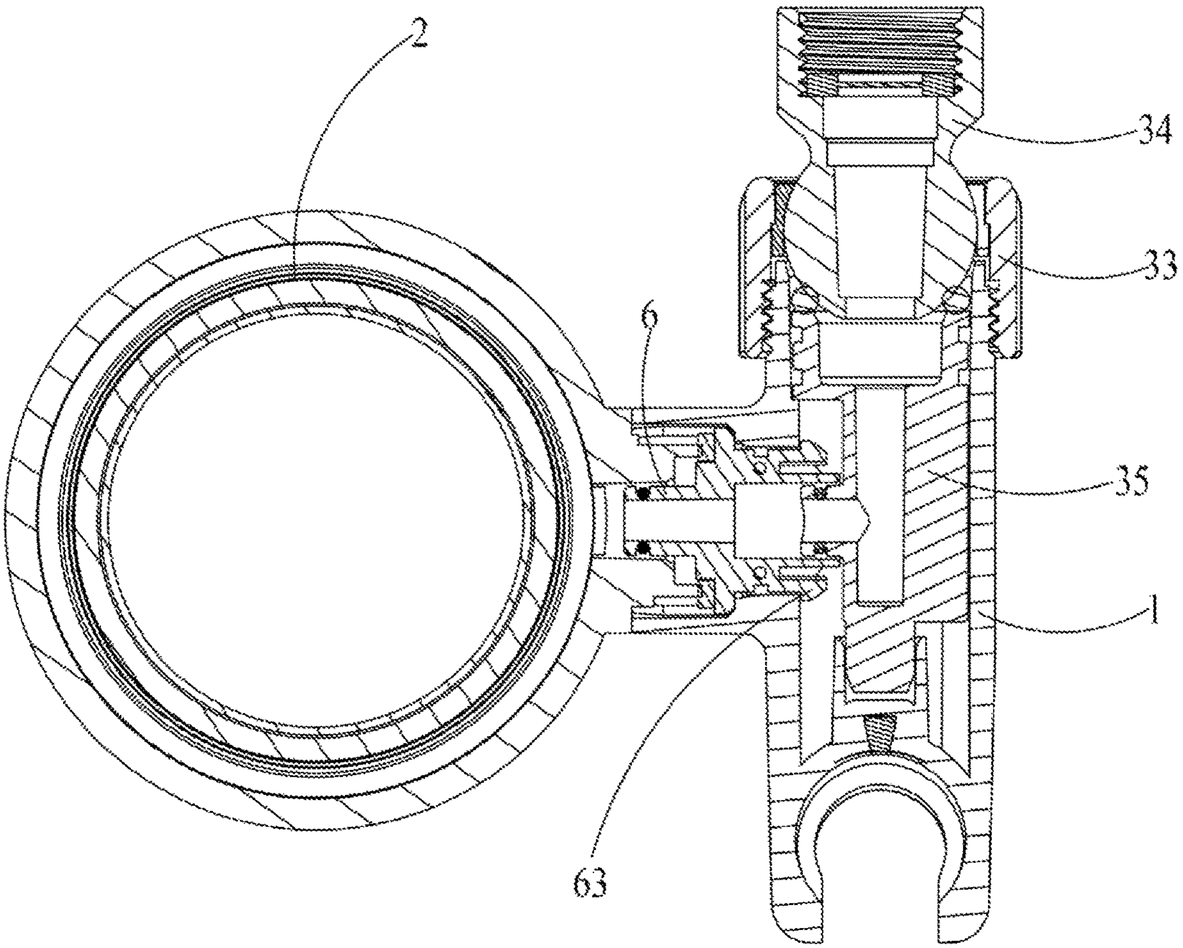
FIG. 11 is a second cross-sectional view of Embodiment 2 of the present disclosure.

As shown in FIG. 4, the inner side wall of the water-passing communication portion 13 of the communication seat 1 is provided with a circumferential bump 131; the outer side wall of the lower housing 222 extends radially to form a connecting portion 223, the connecting portion 223 is provided with a circumferential chute 224, and the circumferential chute 224 is provided with an opening 225 for allowing the circumferential bump 131 to slide into. The circumferential bump 131 can slide into the circumferential chute 224 through the opening 225 and be limited in the circumferential chute 224 so as to connect the filtering assembly 2 with the communication seat 1. Other connecting structures are possible, for example, the filtering assembly 2 is connected with the communication seat 1 through threads.

In this embodiment, the connecting assembly 3 is arranged at the water inlet portion 11 of the communication seat 1, and connects the water inlet pipe 4 with the communication seat 1. Specifically, the connecting assembly 3 includes a connecting nut 31 and a connector 32, wherein the connecting nut 31 is provided with an axial accommodating through hole 311, and the side wall of the accommodating through hole 311 is provided with an internal thread; the connector 32 is partially placed in the accommodating through hole 311 and partially extends out of the connecting nut 31 so as to be inserted into the water inlet portion 11 of the communication seat 1, and the connector 32 is provided with a first water-passing channel 321 in the axial direction so as to communicate with the water inlet channel 14.

Figure 2:
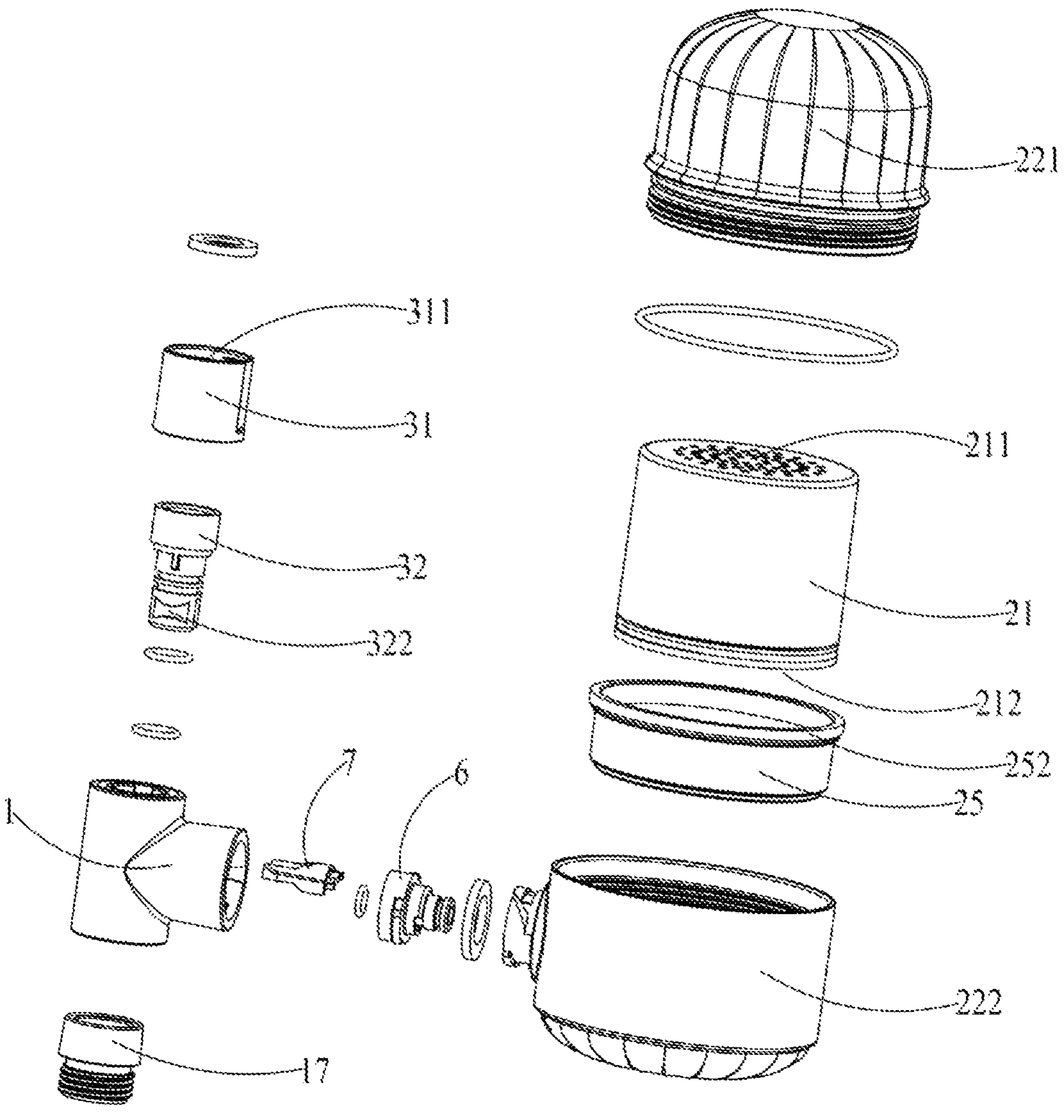
FIG. 2 is a three-dimensional exploded view of Embodiment 1 of the present disclosure.
Figure 3:
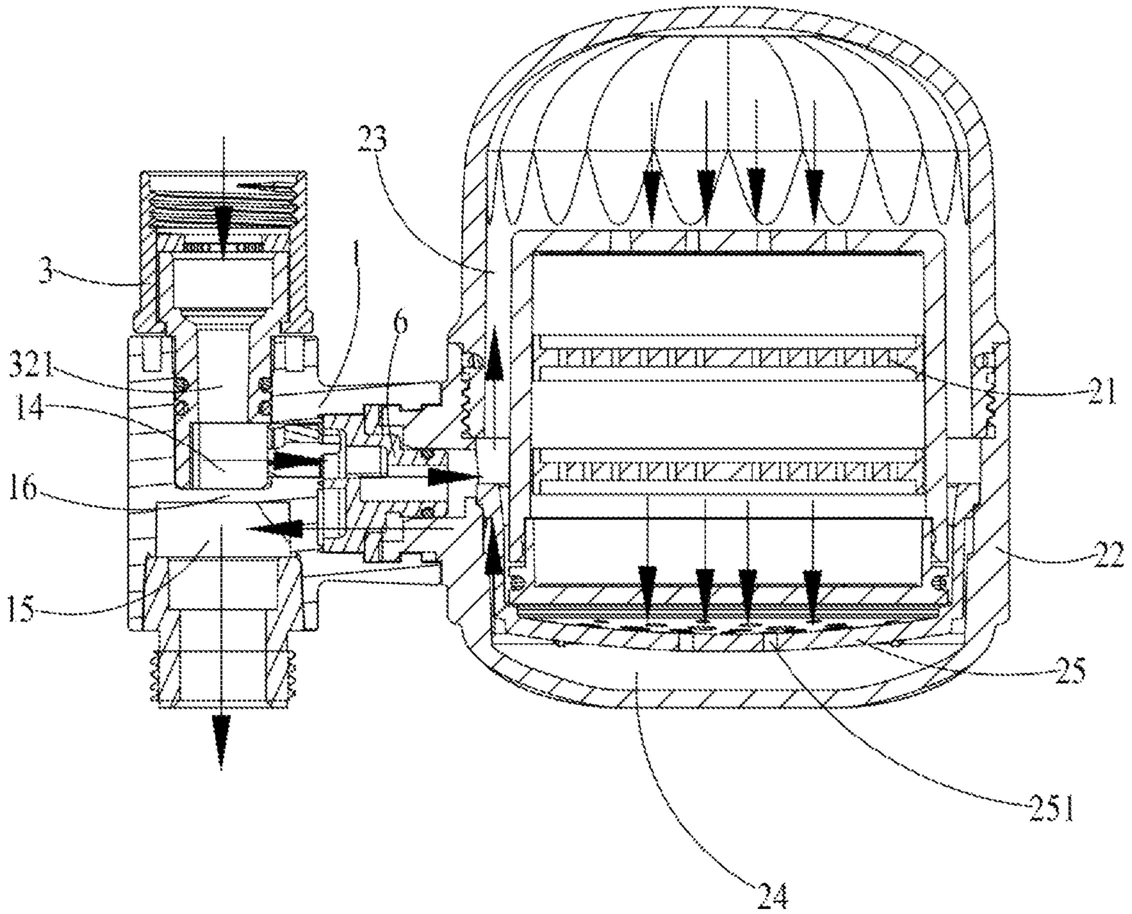
FIG. 3 is a waterway diagram of Embodiment 1 of the present disclosure.

The filtering assembly 2 is connected with the water-passing communication portion 13 of the communication seat 1 through a water diversion seat 6, one end of the water diversion seat 6 is inserted into the filtering assembly 2, specifically, one end of the water diversion seat 6 is inserted into the lower housing 222, the other end of the water diversion seat 6 is connected with a jaw 7 and is inserted into the water-passing communication portion 13 of the communication seat 1, and the jaw 7 is inserted into a slot 322 arranged on the connector 32 for fixing the water diversion seat 6; the water diversion seat 6 is provided with a first connecting water channel 61 and a second connecting water channel 62 which are independent from each other and do not communicate, the first connecting water channel 61 enables the water inlet channel 14 to communicate with the water inlet end 211 of the filter element 21, and the second connecting water channel 62 enables the water outlet end 212 of the filter element 21 to communicate with the water outlet channel 15. The jaw 7 may be integrally formed with the water diversion seat 6, and may also be separately connected to the water diversion seat 6, as shown in FIG. 2.

In this embodiment, the water outlet portion 12 of the communication seat 1 is separately connected with a threaded joint 17, and the threaded joint 17 is connected with the water outlet piece 5. Specifically, a non-threaded portion of the threaded joint 17 is inserted into the water outlet portion 12 of the communication seat 1.

When the overhead shower is used, water flow enters the first water-passing channel 321 of the connector 32 from the water inlet pipe 4, then enters the water inlet channel 14 of the communication seat 1, then enters the first connecting water channel 61 of the water diversion seat 6, enters the first water channel 23 of the housing 22 through the first connecting water channel 61 of the water diversion seat 6 and enters the water inlet end 211 of the filter element 21, after being filtered by the filter element 21, the water flow enters the second water channel 24 of the housing 22 through the water-passing holes 251 of the inner bracket 25 from the water outlet end 212 of the filter element 21, enters the second connecting water channel 62 of the water diversion seat 6 from the second water channel 24 of the housing 22, and then enters the overhead shower body through the water outlet channel 15 of the communication seat 1 to be sprayed through the overhead shower body.

When the filtering device arranged outside a water outlet piece according to the embodiment of the present disclosure is in use, the water inlet portion 11 of the communication seat 1 is connected to the water inlet pipe 4, i.e., the water source, the water outlet portion 12 of the communication seat 1 is connected to the water outlet piece 5, such as an overhead shower, and since the filtering assembly 2 is connected with the water-passing communication portion 13 of the communication seat 1, and the filtering assembly 2 is installed at the side of the communication seat 1, that is, the filtering assembly 2 is installed outside the joint between the water inlet pipe 4 and the water outlet piece 5, the filtering assembly 2 is convenient to replace and low in maintenance cost, and the installation is not easy to limit, and the height of the overhead shower will not be affected even if the filtering device is used in an overhead shower environment, so that the adaptability is high.

Embodiment 2

As shown in FIGS. 7 to 14, a filtering device arranged outside a water outlet piece according to Embodiment 2 of the present disclosure includes a communication seat 1, a filtering assembly 2 and a connecting assembly 3.

The communication seat 1 includes a water inlet portion 11, a water outlet portion 12 and a water-passing communication portion 13. In this embodiment, the water inlet portion 11 is perpendicular to the water outlet portion 12, and the water-passing communication portion 13 is perpendicular to the water inlet portion 11 and the water outlet portion 12, and the side of the communication seat 1 opposite to the water inlet portion 11 is provided with a C-shaped seat. The communication seat 1 is provided with a water inlet channel 14 and a water outlet channel which are independent from each other and do not communicate. In this embodiment, the communication seat 1 is internally provided with a baffle 16, the baffle 16 is located between the water inlet channel 14 and the water outlet channel 15 for blocking the water inlet channel 14 and the water outlet channel 15 so that the water inlet channel 14 does not communicate with the water outlet channel 15. The water inlet channel 14 runs through from the water inlet portion 11 to the water-passing communication portion 13, and the water outlet channel 15 runs through from the water-passing communication portion 13 to the water outlet portion 12. The water inlet portion 11 is configured to be connected to a water inlet pipe 4, and the water outlet portion 12 is configured to be connected to a water outlet piece 5. In this embodiment, the water outlet piece 5 is a handheld shower, which includes a shower body and a hose, wherein the hose is connected to the water outlet portion 12, and the shower body may be placed on the C-shaped seat.

The filtering assembly 2 is connected with the water-passing communication portion 13 of the communication seat 1, and includes a filter element 21, wherein a water inlet end of the filter element 21 communicates with the water inlet channel 14 of the communication seat 1, and a water outlet end of the filter element 21 communicates with the water outlet channel 15 of the communication seat 1.

In this embodiment, the filtering assembly 2 further includes a housing 22, wherein the filter element 21 is placed in the housing 22, a first water channel 23 and a second water channel 24 which are separated from each other are formed between the filter element 21 and the housing 22, the first water channel 23 enables the water inlet channel 14 of the communication seat 1 to communicate with the water inlet end 211 of the filter element 21, and the second water channel 24 enables the water outlet end 212 of the filter element 21 to communicate with the water outlet channel 15 of the communication seat 1.

Specifically, the filtering assembly 2 further includes an inner bracket 25, wherein the inner bracket 25 is of a cavity structure formed by a bottom plate and a side plate surrounding the bottom plate, and the bottom plate is provided with water-passing holes 251; the housing 22 is composed of an upper housing 221 and a lower housing 222, the inner bracket 25 is placed in the lower housing 222, and the end of the side plate of the inner bracket 25 is provided with a radial flange 252 in sealing fit with the inner side wall of the lower housing 222. The filter element 21 is placed in the inner bracket 25, and the water outlet end 212 of the filter element 21 communicates with the water-passing holes 251 of the inner bracket 25. The first water channel 23 is formed between the filter element 21 and the upper housing 221, and the second water channel 24 is formed between the inner bracket 25 and the lower housing 222, and the first water channel 23 and the second water channel 24 are separated by the inner bracket 25.

Figure 12:
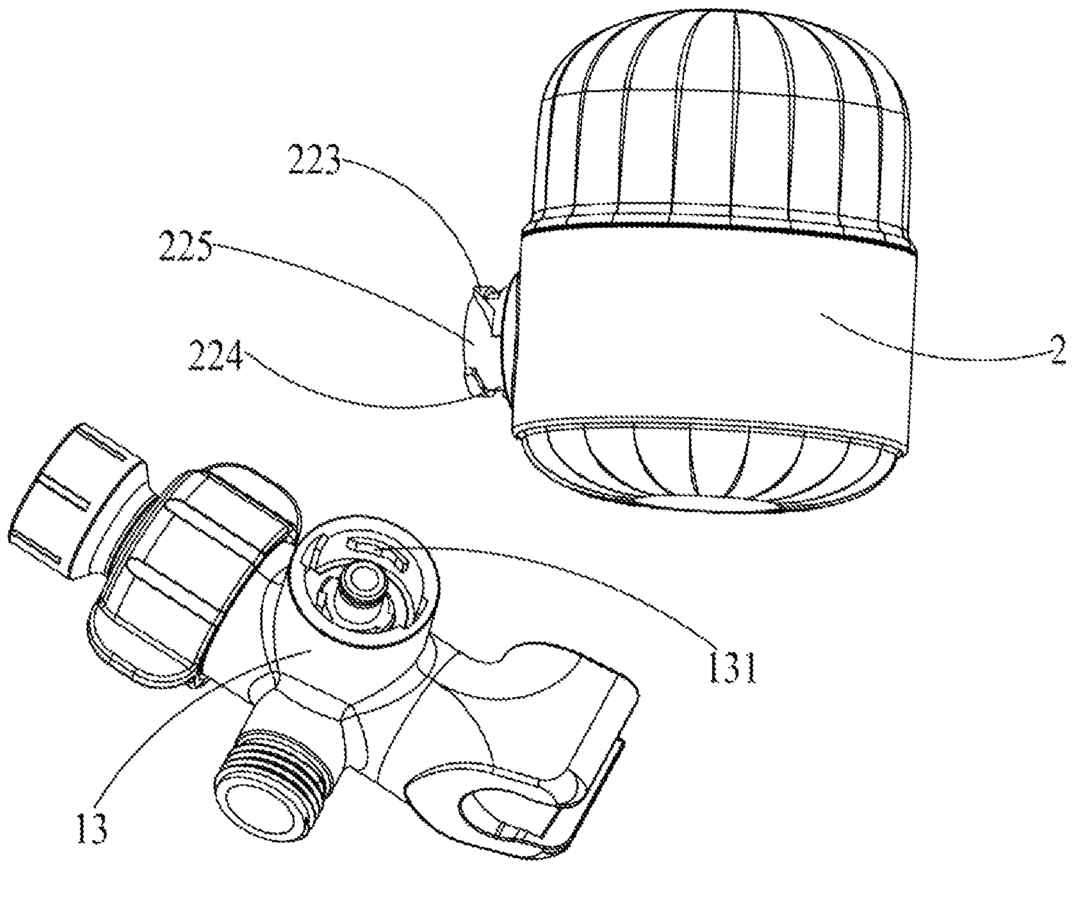
FIG. 12 is a partial assembly schematic diagram (assembly schematic diagram of a housing and a communication seat) of Embodiment 2 of the present disclosure.
Figure 13:
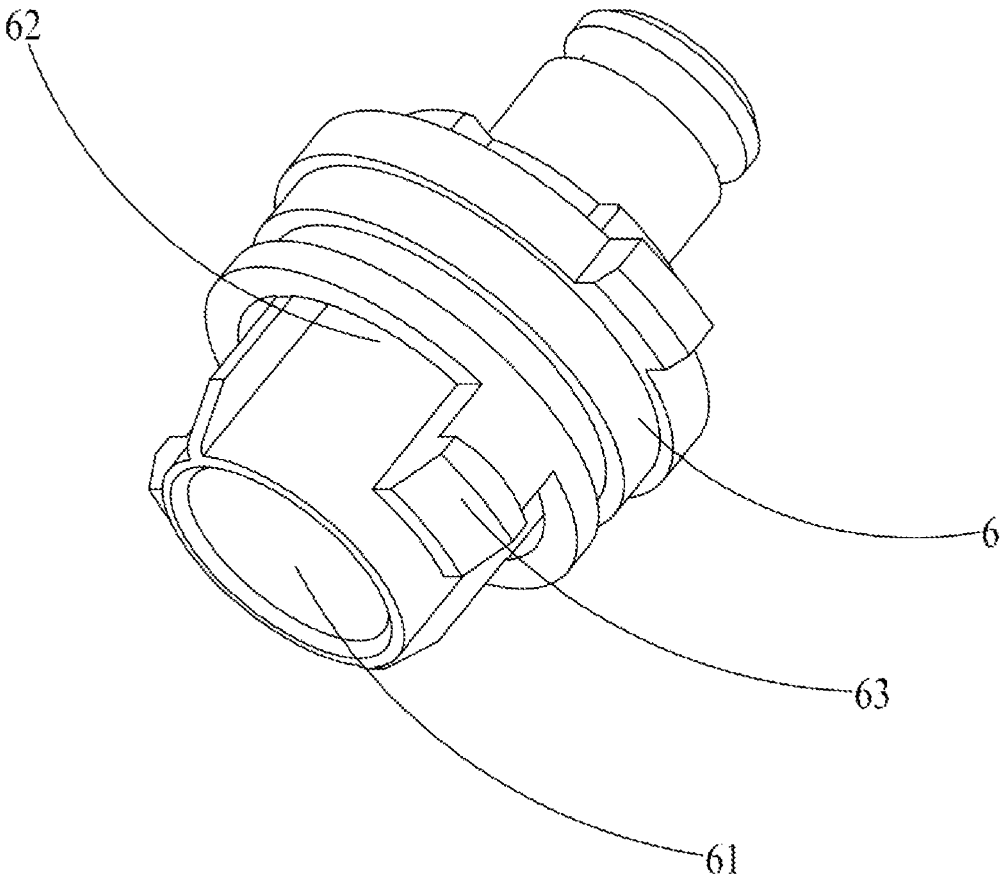
FIG. 13 is a structural schematic diagram of a water diversion seat according to Embodiment 2 of the present disclosure.
Figure 14:
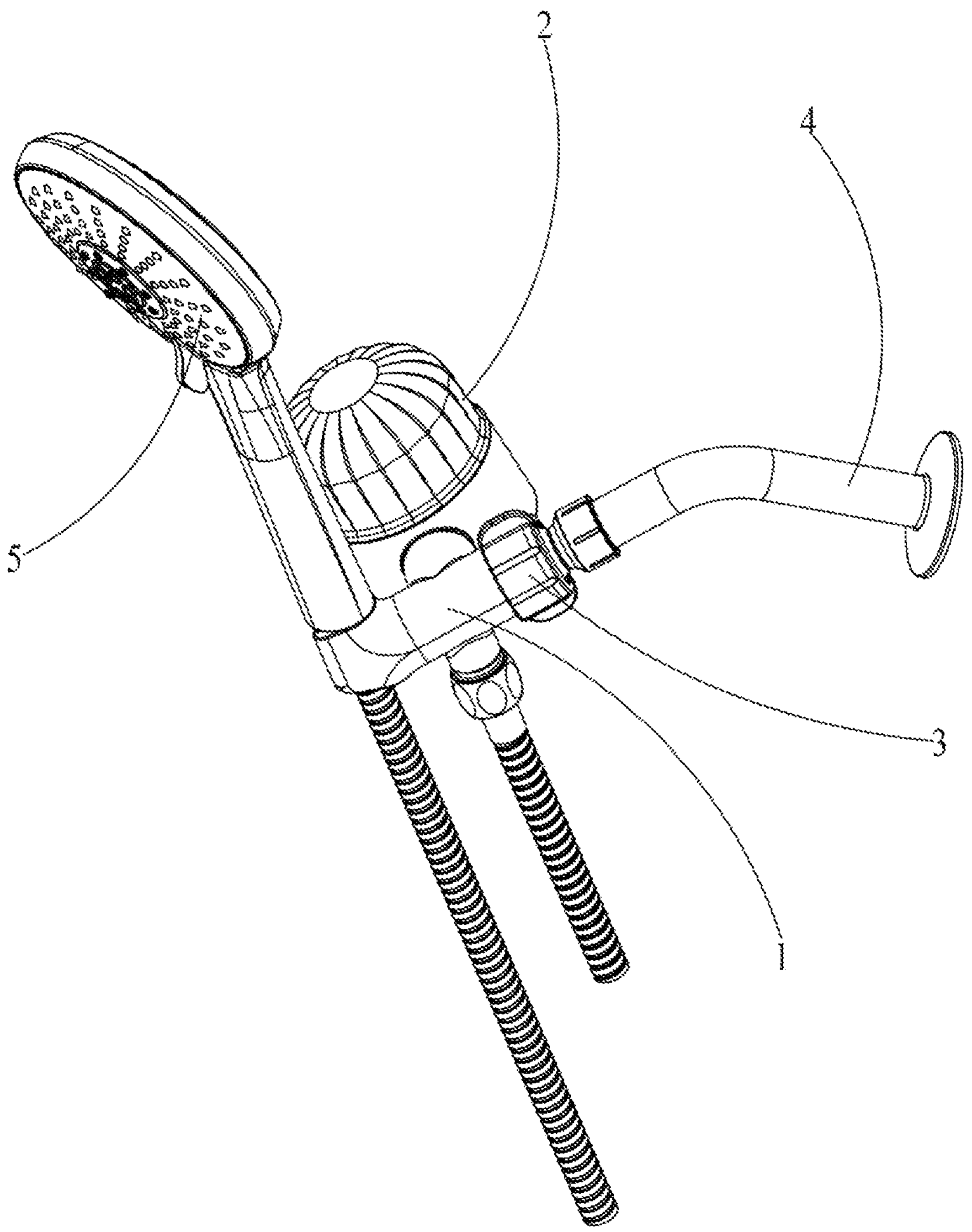
FIG. 14 is a usage state diagram of Embodiment 2 of the present disclosure.

As shown in FIG. 12, the inner side wall of the water-passing communication portion 13 of the communication seat 1 is provided with a circumferential bump 131; the outer side wall of the lower housing 222 extends radially to form a connecting portion 223, the connecting portion 223 is provided with a circumferential chute 224, and the circumferential chute 224 is provided with an opening 225 for allowing the circumferential bump 131 to slide into. The circumferential bump 131 can slide into the circumferential chute 224 through the opening 225 and be limited in the circumferential chute 224 so as to connect the filtering assembly 2 with the communication seat 1. Other connecting structures are possible, for example, the filtering assembly 2 is connected with the communication seat 1 through threads.

In this embodiment, the connecting assembly 3 is arranged at the water inlet portion 11 of the communication seat 1, and connects the water inlet pipe 4 with the communication seat 1. Specifically, the connecting assembly 3 includes a connecting nut 33, a ball joint 34 and a socket the connecting nut 33 is connected with the water inlet portion 11 of the communication seat 1; the socket 35 is partially inserted into the water inlet portion 11 of the communication seat 1 and partially placed in the connecting nut 33; the ball joint 34 is partially limited in the connecting nut 33 and partially extends out of the connecting nut 33; the ball joint 34 and the socket 35 are provided with second water-passing channels 36 communicating with each other so as to communicate with the water inlet channel 14.

In this embodiment, the filtering assembly 2 is connected with the water-passing communication portion 13 of the communication seat 1 through a water diversion seat 6, one end of the water diversion seat 6 is inserted into the filtering assembly 2, specifically, one end of the water diversion seat 6 is inserted into the lower housing 222, the other end of the water diversion seat 6 is connected with a snap 63 and is inserted into the water-passing communication portion 13 of the communication seat 1, the snap 63 is integrally formed with the water diversion seat 6, the snap 63 is snapped onto the inner side wall of the water-passing communication portion 13; the water diversion seat 6 is provided with a first connecting water channel 61 and a second connecting water channel 62 which are independent from each other and do not communicate, the first connecting water channel 61 enables the water inlet channel 14 to communicate with the water inlet end 211 of the filter element 21, and the second connecting water channel 62 enables the water outlet end 212 of the filter element 21 to communicate with the water outlet channel 15.

In this embodiment, the water outlet portion 12 of the communication seat 1 is integrally connected to a threaded joint 17, and the threaded joint 17 is connected to the water outlet piece 5.

When the handheld shower is used, water flow enters the second water-passing channels 36 of the ball joint 34 and the socket 35 from the water inlet pipe 4, then enters the water inlet channel 14 of the communication seat 1, then enters the first connecting water channel 61 of the water diversion seat 6, enters the first water channel 23 of the housing 22 through the first connecting water channel 61 of the water diversion seat 6 and enters the water inlet end 211 of the filter element 21, after being filtered by the filter element 21, the water flow enters the second water channel 24 of the housing 22 through the water-passing holes 251 of the inner bracket 25 from the water outlet end 212 of the filter element 21, enters the second connecting water channel 62 of the water diversion seat 6 from the second water channel 24 of the housing 22, and then enters the hose of the handheld shower through the water outlet channel 15 of the communication seat 1 to be sprayed through the shower body.

When the filtering device arranged outside a water outlet piece according to the embodiment of the present disclosure is in use, the water inlet portion 11 of the communication seat 1 is connected to the water inlet pipe 4, i.e., the water source, the water outlet portion 12 of the communication seat 1 is connected to the water outlet piece 5, such as the handheld shower, and since the filtering assembly 2 is connected with the water-passing communication portion 13 of the communication seat 1, and the filtering assembly 2 is installed at the side of the communication seat 1, that is, the filtering assembly 2 is installed outside the joint between the water inlet pipe 4 and the water outlet piece 5, the filtering assembly 2 is convenient to replace and low in maintenance cost, and the installation is not easy to limit, and the height of the overhead shower will not be affected even if the filtering device is used in an overhead shower environment, so that the adaptability is high.

In the description of the present disclosure, it should be understood that, the terms “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “counterclockwise” and the like indicate an orientation or positional relationship based on the orientation or positional relationship shown in the drawings, only for ease of description of the present disclosure and for simplicity of description, it is not intended to indicate or imply that the device or element referred to must have a particular orientation, be constructed and operate in a particular orientation, and therefore should not be construed as limiting the present disclosure.

Furthermore, the terms “first” and “second” are used for descriptive purposes only, and cannot be understood to indicate or imply relative importance or to implicitly specify the number of technical features indicated. Thus, features defined as “first” and “second” may explicitly or implicitly include one or more of that feature. In the description of the present disclosure, “plurality of” means two or more, unless expressly and specifically defined otherwise.

As used herein, unless expressly specified and limited otherwise, the terms “installed”, “connection”, “connected”, “fixed” and the like are to be construed broadly, e.g., connection may be fixed connection, detachable connection or integrated connection; connection may also be mechanical connection or electrical connection; connection may also be direct connection or indirect connection through an intermediate medium and may be communication between two elements or interaction between two elements. The specific meaning of the above terms in the present disclosure may be understood by a person having ordinary skill in the art according to specific circumstances.

In the present disclosure, unless expressly specified and defined otherwise, a first feature being “above” or “below” a second feature may include that the first and second features are in direct contact or that the first and second features are not in direct contact but are in contact through another feature between them. Also, a first feature being “above”, “on” or “over” a second feature includes the first feature is right above and obliquely above the second feature, or simply indicates that the first feature is at a level higher than the second feature. A first feature being “below”, “under” and “beneath” a second feature includes that the first feature is right below and obliquely below the second feature, or simply indicates that the first feature is at a level lower than the second feature.

In the description of this description, the description referring to “one embodiment”, “some embodiments”, “an example”, “a specific example”, or “some examples” or the like means that a particular feature, structure, material, or characteristic described in conjunction with the embodiment or example is included in at least one embodiment or example of the present disclosure. In this description, schematic expressions of the above terms should not be understood as necessarily referring to the same embodiment or example. Furthermore, the particular features, structures, materials, or characteristics described may be combined in any suitable manner in one or more embodiments or examples. Furthermore, different embodiments or examples described in this description may be joined and combined by those skilled in the art.

Although embodiments of the present disclosure have been shown and described above, it will be appreciated that the above embodiments are illustrative and not to be construed as limiting the present disclosure, and that a person having ordinary skill in the art may make changes, modifications, substitutions, and variations to the above embodiments within the scope of the present disclosure.

What is claimed is:

1. A shower water filtering device for connection to a water supply conduit, comprising:
- a communication seat (1), including:
  - a water inlet portion (11);
  - a water outlet portion (12);
  - a water-passing communication portion (13), wherein the communication seat (1) is provided with a water inlet channel (14) fluidically isolated from a water outlet channel (15) by a baffle (16), the water inlet channel (14) extends from the water inlet portion (11) to the water-passing communication portion (13), and the water outlet channel (15) extends from the water-passing communication portion (13) to the water outlet portion (12); the water inlet portion (11) is configured to be connected to the water supply conduit, and the water outlet portion (12) is configured to be connected to a water outlet piece;
- a filtering assembly (2), including:
  - an upper housing (221) having an externally threaded lower portion;
  - a lower housing (222) having a connecting portion (223) and an internally threaded upper portion capable of threadably and sealably engaging the externally threaded portion of the upper housing (221), the upper housing and the lower housing together defining an internal cavity when threaded together;
  - an inner bracket (25) having a radial flange (252) sized to sealingly engage an inner side wall of the lower housing (222);
- a filter element (21) disposed within the internal cavity, above and engaging the inner bracket (25), the filter element (21) including a water inlet end (211) in fluid communication with the water inlet channel (14) of the communication seat (1), and a water outlet end (212) is in fluid communication with the water outlet channel (15) of the communication seat (1); and
- a water diversion seat (6) with one end of the water diversion seat (6) inserted into the connecting portion (223), the other end of the water diversion seat (6) is connected to a jaw (7) that is inserted into the water-passing communication portion (13) of the communication seat (1), and into a slot (322) arranged on a connector (32) that is inserted into the water inlet portion (11) for fixing the water diversion seat (6).

2. The shower water filtering device of claim 1, wherein the jaw (7) and the water diversion seat (6) are integrally formed.

3. The shower water filtering device of claim 1, wherein an inner side wall of the water-passing communication portion (13) of the communication seat (1) is provided with a circumferential bump (131).

4. The shower water filtering device of claim 3, wherein the connecting portion (223) is provided with a circumferential chute (224) and an opening (225) for allowing the circumferential bump (131) to slide in through the opening (225) to connect the filtering assembly (2) with the communication seat (1).

5. The shower water filtering device of claim 1, wherein the inner bracket (25) is of a cavity structure formed by a bottom plate and a side plate surrounding the bottom plate, and the bottom plate including a water-passing hole (251).

* * * * *